(12) United States Patent
Matsunaga et al.

(10) Patent No.: US 8,390,715 B2
(45) Date of Patent: Mar. 5, 2013

(54) SOLID-STATE IMAGING DEVICE

(75) Inventors: Yoshiyuki Matsunaga, Kyoto (JP); Kunihiko Hara, Osaka (JP); Hiroyuki Hayashita, Hyogo (JP); Yoshihisa Minami, Shiga (JP)

(73) Assignee: Panasonic Corporation, Osaka (JP)

( * ) Notice: Subject to any disclaimer, the term of this patent is extended or adjusted under 35 U.S.C. 154(b) by 279 days.

(21) Appl. No.: 12/763,464

(22) Filed: Apr. 20, 2010

(65) Prior Publication Data
US 2010/0271522 A1    Oct. 28, 2010

(30) Foreign Application Priority Data
Apr. 28, 2009   (JP) .................................. 2009-110111

(51) Int. Cl.
*H04N 5/335*    (2011.01)
(52) U.S. Cl. ........................................ 348/308; 348/301
(58) Field of Classification Search .................. 348/300, 348/301, 308, 294; 257/290, 291
See application file for complete search history.

(56) References Cited

U.S. PATENT DOCUMENTS

| | | | |
|---|---|---|---|
| 7,339,616 B2 | 3/2008 | Mabuchi et al. | |
| 7,379,109 B2 | 5/2008 | Masuyama et al. | |
| 7,679,665 B2 | 3/2010 | Egawa et al. | |
| 7,911,522 B2 | 3/2011 | Egawa et al. | |
| 8,253,835 B2 | 8/2012 | Egawa et al. | |
| 2004/0183930 A1 | 9/2004 | Masuyama et al. | |
| 2007/0139544 A1 | 6/2007 | Egawa et al. | |
| 2008/0204822 A1 | 8/2008 | Yamamoto | |
| 2008/0211949 A1 | 9/2008 | Masuyama et al. | |
| 2009/0160990 A1* | 6/2009 | Johnson | 348/308 |
| 2009/0237538 A1 | 9/2009 | Masuyama et al. | |
| 2009/0321865 A1 | 12/2009 | Kasano et al. | |

(Continued)

FOREIGN PATENT DOCUMENTS

| | | |
|---|---|---|
| JP | 2004-304771 | 10/2004 |
| JP | 2006-191397 | 7/2006 |

(Continued)

OTHER PUBLICATIONS

Office Action mailed Jan. 15, 2013 issued in corresponding JP patent application No. 2009-110111.

*Primary Examiner* — Tuan Ho
(74) *Attorney, Agent, or Firm* — McDermott Will & Emery LLP

(57) ABSTRACT

The present invention provides a solid-state imaging device which is capable of high-speed and high-quality pixel mixture. The solid-state imaging device includes: a plurality of pixels; a row selecting circuit; a plurality of column signal lines each of which is provided to a corresponding one of columns of pixels, is connected to pixels of the corresponding column, and transfers the signals outputted from the connected pixels; a pixel current source which (i) is provided to a corresponding one of the column signal lines, (ii) is connected to the corresponding column signal line, and (iii) supplies to the connected column signal line a current when the signal is outputted from the selected pixel to the connected column signal line; and a control unit which changes the number of rows of pixels being simultaneously selected by the row selecting circuit, and values of the current supplied by the pixel current source.

20 Claims, 21 Drawing Sheets

U.S. PATENT DOCUMENTS

| | | |
|---|---|---|
| 2009/0322917 A1 | 12/2009 | Kyogoku et al. |
| 2009/0322921 A1 | 12/2009 | Ishimoto et al. |
| 2010/0020217 A1 | 1/2010 | Abe et al. |
| 2010/0073539 A1 | 3/2010 | Endo |
| 2010/0134670 A1 | 6/2010 | Egawa et al. |
| 2010/0134674 A1 | 6/2010 | Egawa et al. |
| 2010/0149392 A1* | 6/2010 | Hara ............................. 348/300 |
| 2011/0234874 A1* | 9/2011 | Sato ............................. 348/301 |
| 2012/0038806 A1* | 2/2012 | Funamizu et al. ............. 348/300 |

FOREIGN PATENT DOCUMENTS

JP  2007-173950 A  7/2007

* cited by examiner

Vrst=3.3 Vth=0.5, VL=0.6

Vrst=3.3 Vth=0.5, VL=0.6

SOLID-STATE IMAGING DEVICE

BACKGROUND OF THE INVENTION (1) Field of the Invention

The present invention relates to a solid-state imaging device including pixels which perform photoelectric-conversion on incident light and are arranged two-dimensionally on a semiconductor substrate.

(2) Description of the Related Art

A MOS image sensor has excellent characteristics, such as operating at a high-speed and providing a high-sensitivity, and the market for digital single lens reflex cameras (DSLR) equipped with the MOS image sensor is rapidly expanding recently. The MOS image sensor is utilized only for capturing a still picture in a conventional DSLR. For a finder of the DSLR, a conventional optical finder is employed. Meanwhile, becoming mainstream today is a camera featuring a live preview capability which displays, in real time, a monitor image on a small liquid crystal display installed of on the camera body, the monitor image which is detected by an image sensor. Thus, on most of image sensors, both of the progressive-scanning mode for capturing a still picture, and the pixel mixture mode for a live view are available.

FIG. 19 shows an overall structure of a conventional solid-state imaging device disclosed in Patent Reference 1.

An object of the solid-state imaging device is to improve a signal-to-noise (S/N) ratio in both of the pixel mixture mode in which pixel signals are mixed and a mode with no pixels mixed. The solid-state imaging device includes a signal processing unit 100, an image area (imaging area) 510 on which plural unit cells (pixels) 500 are two dimensionally arranged, a column signal line 520, a row selecting circuit 530, a load transistor group 540 connected to the column signal line 520, a column selecting circuit 560, a row common signal line 570, and an output amplifier 580 connected to the row signal common line 570.

Each pixel 500 includes a photodiode 501, a reading transistor 502, an amplifying transistor 503, a reset transistor 504, a column selection transistor 505, and a floating diffusion (FD) 506. In the pixels 500 on the n-th row, READ (n) is supplied to a gate of the reading transistor 502, RESET (n) to a gate of the reset transistor 504, and LSET (n) to a gate of the column selection transistor 505.

Citation List

Patent Literature

Patent Literature 1: Japanese Unexamined Patent Application Publication No. 2004-304771

SUMMARY OF THE INVENTION

In the conventional solid-state imaging device, the signal processing unit has as many individual sample and hold (S/H) capacitors as the number of pixels mixed in a column direction (the number of column pixels). When the pixel signals are mixed, each pixel signal is individually transferred to the corresponding S/H capacitor, and the pixel signals are mixed on the row common signal line. Thus, the conventional solid-state imaging device has a problem in that: high-speed data reading is difficult; and responsiveness is low to an object moving at a high speed in the live view of the DSLR. Further, increasing number of column pixels leads to the greater number of S/H capacitors, which causes a problem of a larger chip size.

Meanwhile, decimating, to read, the pixels in a column direction and mixing the pixels provided in a row direction alone makes possible realizing a high-speed live view mode. This however causes a problem of deteriorating the image quality.

In view of the above problems, the present invention has as a first object to provide a small solid-state imaging device capable of high-speed pixel mixture.

A second object of the present invention is to provide a solid-state imaging device capable of high-quality pixel mixture.

In order to achieve the above objectives, a solid-state imaging device according to an aspect of the present invention includes: an imaging area including pixel cells arranged two-dimensionally on a semiconductor substrate, each of the pixel cells having at least (i) a photodiode which accumulates signal charge obtained through photoelectric-conversion performed on incident light, (ii) an amplifying transistor which has a gate to which a voltage is applied according to the signal charge accumulated by the photodiode, and (iii) a reset transistor which resets a potential applied to the gate of the amplifying transistor; a row selecting circuit which simultaneously drives the pixel cells arranged on a same row; a column signal line which connects in a column direction outputs of amplifying transistors, including the amplifying transistor, included in the pixel cells arranged on the same column; a pixel current source circuit which is connected to the column signal line and forms a source follower circuit along with the amplifying transistors in the pixel cells; a row signal line which transfers signals provided to the column signal line in a row direction; and a column selecting circuit which sequentially transfers to the row signal line the signals provided to the column signal line, wherein, when the row selecting circuit simultaneously drives the pixel cells arranged on rows, (i) the source follower circuit having multi-inputs and a single-output includes (a) the amplifying transistors in the pixel cells connected via the column signal line, the connected pixel cells being included in the pixels arranged on the rows, and (b) the pixel current source circuit connected with the outputs of the amplifying transistors in the pixel cells connected via the column signal line, and (ii) the source follower circuit weighted-averages in a voltage area outputs of the pixel cells connected via the column signal line, and to provide the weighted-averaged outputs to the column signal line. In addition, the solid-state imaging device according to the aspect of the present invention includes: a plurality of pixels which are two-dimensionally arranged, each of the plurality of pixels outputting a signal according to an amount of received light; a row selecting circuit which selects a row of pixels, and causes the selected row of pixels to output the signal; a plurality of column signal lines each of which (i) is provided to a corresponding one of columns of pixels, (ii) is connected to pixels of the corresponding column, and (iii) transfers the signals outputted from the connected pixels; a pixel current source which (i) is provided to a corresponding one of the column signal lines, (ii) is connected to the corresponding column signal line, and (iii) supplies to the connected column signal line a current when the signal is outputted from the selected pixel to the connected column signal line; and a control unit which changes (i) the number of rows of pixels being simultaneously selected by the row selecting circuit, and (ii) values of the current supplied by the pixel current source.

Instead of accumulating signals, for each row, in an individual S/H capacitor, and mixing the accumulated signals on the row common signal line, this (i) allows: the plural rows to be simultaneously selected; and the signals from the plural rows to be simultaneously outputted to the column signal lines, and (ii) makes possible mixing the signals on the column signal lines. Thus, the solid-state imaging device in accordance with the present invention can enjoy a high-speed pixel mixture capability. In addition, since the solid-state imaging device eliminates the need for providing an individual S/H capacitor corresponding to the number of pixels to be mixed, the chip size thereof can be smaller to realize a smaller solid-state imaging device.

Further, the most suitable current value can be selected by changing current values of the pixel current source between the pixel mixture mode which involves mixing the signals from the pixels and the progressive-scanning mode which involves no mixture of the signals. Thus, the solid-state imaging device according to the implementation of the present invention can secure a wide dynamic range in the pixel in both of the progressive-scanning mode and the pixel mixture mode, which makes possible realizing high picture quality.

Furthermore, a solid-state imaging device according to another aspect of the present invention includes: a plurality of pixels which are two-dimensionally arranged, each of the plurality of pixels outputting a signal according to an amount of received light; a row selecting circuit which selects a row of pixels, and causes the selected row of pixels to output the signal; a plurality of column signal lines each of which (i) is provided to a corresponding one of columns of pixels, (ii) is connected to pixels of the corresponding column, and (iii) transfers the signals outputted from the connected pixels; a pixel current source which (i) is provided to a corresponding one of the column signal lines, (ii) is connected to the corresponding column signal line, and (iii) supplies to the connected column signal line a current when m the signal is outputted from the selected pixel to the connected column signal line; and a control unit which controls the row selecting circuit so that the row selecting circuit simultaneously selects a plurality of rows.

Since this allows the signals from the pixels to be mixed on the column signal lines, the solid-state imaging device according to the other implementation of the present invention can enjoy a high-speed pixel mixture capability. In addition, since the solid-state imaging device eliminates the need for providing an individual S/H capacitor corresponding to the number of pixels to be mixed, the chip size thereof can be smaller to realize a smaller solid-state imaging device.

In accordance with a solid-state imaging device according to an implementation of the present invention, a small solid-state imaging device capable of high-speed pixel mixture can be realized. Further, the implementation of the present invention can realize a solid-state imaging device capable of high-quality pixel mixture. In other words, high-speed and high-quality pixel mixture makes possible realizing a solid-state imaging device which achieves both of a high-quality still picture imaging capability and a high-speed live view capability.

FURTHER INFORMATION ABOUT TECHNICAL BACKGROUND TO THIS APPLICATION

The disclosure of Japanese Patent Application No. 2009-110111 filed on Apr. 28, 2009 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

Embodiment 1

Described hereinafter in detail is a solid-state imaging device in accordance with Embodiment 1 of the present invention, with reference to the drawings.

Figure 1:
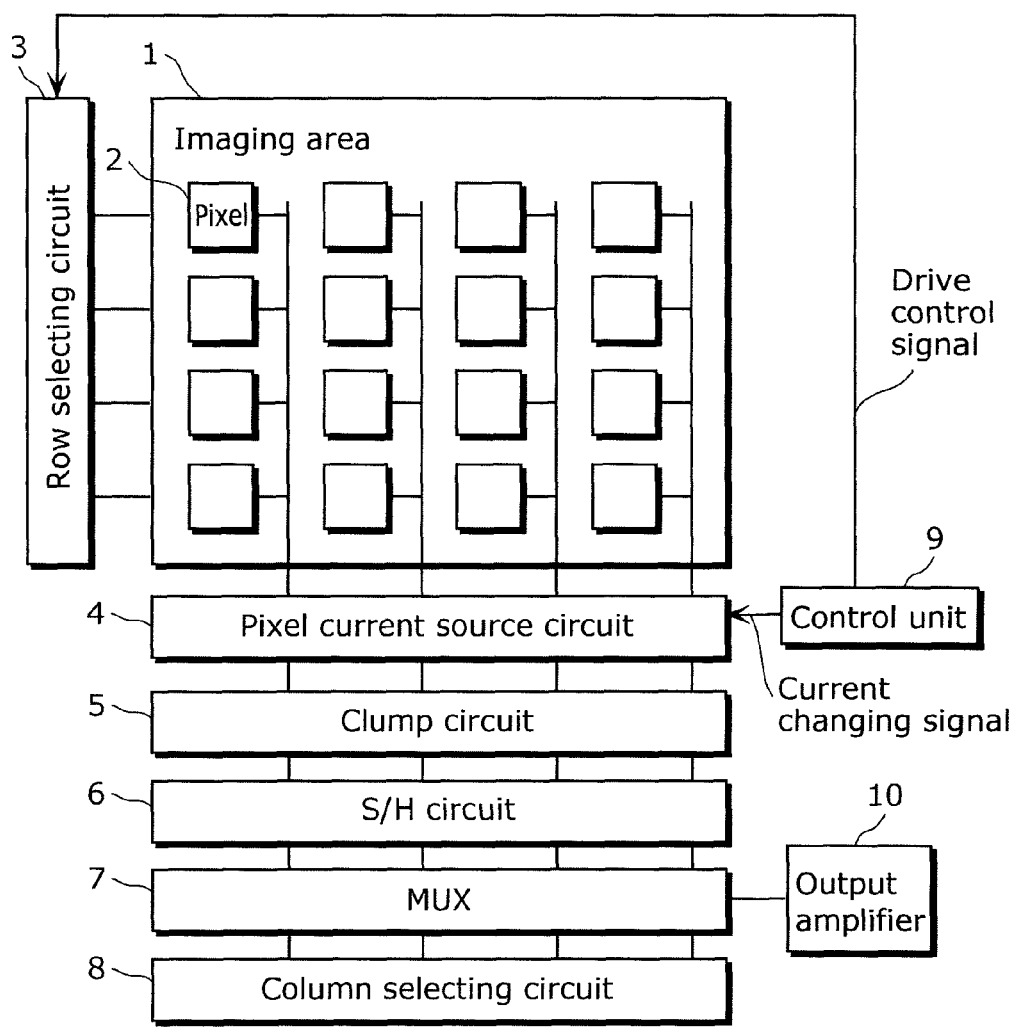
FIG. 1 shows an overall structure of a solid-state imaging device in accordance with an embodiment 1 of the present invention.

FIG. 1 shows an overall structure of the solid-state imaging device in accordance with Embodiment 1.

As shown in FIG. 1, the solid-state imaging device includes an imaging area (a pixel arranging unit) 1, a row selecting circuit (a vertical address circuit) 3, a pixel current source circuit 4, a clump circuit 5, an S/H circuit 6, an MUX 7, a column selecting circuit (a horizontal address circuit) 8, a control unit 9, an output amplifier 10, and a row common signal line (not shown).

In the imaging area 1, plural pixels (pixel circuits or pixel cells) 2 are two-dimensionally provided (arranged) on a semiconductor substrate. Each of pixels 2 performs photoelectric-conversion and outputs a signal (pixel signal) according to an amount of received light. It is noted that FIG. 1 exemplifies 16 pixels two-dimensionally arranged in 4×4; meanwhile, the actual number of pixels is as many as several millions or more in total.

The row selecting circuit 3 selects (drives or activates) a row of the pixels 2; that is, the row selecting circuit 3 simultaneously turns on a transistor Tr, a reset Tr, or a selecting Tr which are included in the pixels 2 arranged on the same row. Then, the row selecting circuit 3 causes the selected row of pixels 2 to output the signals. The row selecting circuit 3 simultaneously drives the pixels 2 arranged on the same row. Here, a column signal line brings together in a column direction the outputs from amplifying transistors included in the pixels 2 arranged on the same column. The row selecting circuit 3 includes three control lines; namely an "RST", a "TRAN", and an "SEL", for each column of the pixel 2. For each row of the pixel 2, the row selecting circuit 3 controls resetting, reading, and line-selecting (row selecting) performed in each pixel 2. Based on a drive control signal, from the control unit 9, which is set according to the number of mixed pixels transferred, the row selecting circuit 3 is capable of switching the numbers of selected rows in a reading operation of the signal out of the pixel 2.

When resetting and reading the signal, the pixel current source circuit 4 generates a current used for causing the signal to be read to a column signal line. The pixel current source circuit 4 changes values of the generated current according to a current changing signal, from the control unit 9, changing based on the number of the mixed pixels transferred. Connected to one end of the column signal line, the pixel current source circuit 4 forms a source follower circuit along with the amplifying transistors in the pixels 2.

The clump circuit 5 is structured to have base units each of which is provided to a corresponding one of columns on which the pixels 2 are arranged, the base units which are arranged in an array in a row direction. The clump circuit 5 removes a fixed pattern noise component, generated by the pixel 2, from the signal outputted for each row to the column signal line.

The S/H circuit 6 is structured to have base units each of which is provided to a corresponding one of columns on which the pixels 2 are arranged, the base units which are arranged in an array in a row direction. The S/H circuit 6 holds output from the clump circuit 5.

The MUX 7 switches a connection between each base unit in the S/H circuit 6 and the output amplifier 10.

The row common signal line transfers signals provided to the column signal line in a row direction. The column selecting circuit 8: includes a control line; controls the switching of the MUX 7; and sequentially transfers the signals provided to the column signal line in to the row common signal line. The column selecting circuit 8 has the signals added at the row common signal line, the signals having been provided to column signal lines, including the column signal line, arranged in the row direction.

The output amplifier 10 receives the output from the S/H circuit 6 via the MUX 7, amplifies the received output, and then outputs the amplified output out of the chip.

The control unit 9 supplies the drive control signal to the row selecting circuit 3 to change the numbers of the rows which are simultaneously selected by the row selecting circuit 3. The control unit 9 supplies a current changing signal to the pixel current source circuit 4 to change the values of the currents supplied to the column signal line by the pixel current source circuit 4. According to the number of the rows simultaneously selected by the row selecting circuit 3, the control unit 9 changes the values of the current supplied to the column signal line by the pixel current source circuit 4. When the row selecting circuit 3 simultaneously selects plural rows, for example, the control unit 9 changes the values of the current; accordingly, the pixel current source circuit 4 supplies to the column signal line the current having a value greater than a value of the current supplied when just one row is selected. In other words, the control unit 9 changes the values of the current so that the pixel current source circuit 4 supplies to the column signal line a current larger in a mode executing addition of the signals of the pixels 2 than in a mode not executing addition of the signals of the pixels 2.

In the pixel mixture mode, the control unit 9 controls the row selecting circuit 3 by supplying the drive control signal to the row selecting circuit 3, so that the row selecting circuit 3 simultaneously selects plural rows. The control unit 9 controls the row selecting circuit 3, so that signal voltages of the pixels 2, which are which are arranged on the plural rows simultaneously selected by the row selecting circuit 3, are averaged, in a voltage area, on one column signal line, the pixels 2. In other words, when the row selecting circuit 3 simultaneously drives the pixels 2 arranged on rows, the control unit 9 controls the row selecting circuit 3 so that (i) the source follower circuit having multi-inputs and a single-output includes (a) the amplifying transistors in the pixels 2 connected via the column signal line, the connected pixels 2 being included in the pixels 2 arranged on the rows, and (b) the pixel current source circuit 4 connected with the outputs of the amplifying transistors in the pixels 2 connected via the column signal line, and (ii) the source follower circuit weighted-averages in a voltage area outputs of the pixels 2 connected via the column signal line, and to provide the weighted-averaged outputs to the column signal line. The control unit 9 controls the row selecting circuit 3, so that the transfer transistors included in the pixels 2, arranged on the plural rows, which are simultaneously driven by the row selecting circuit 3 are basically simultaneously turned on at a timing at which the outputs are provided from the pixels to the column signal line. Further, the control unit 9 controls the row selecting circuit 3, so that row selecting transistors included in the pixels 2, arranged on the plural rows, which are simultaneously driven by the row selecting circuit 3 are basically simultaneously turned on at a timing at which the outputs are provided from the pixels to the column signal line.

Figure 2A:
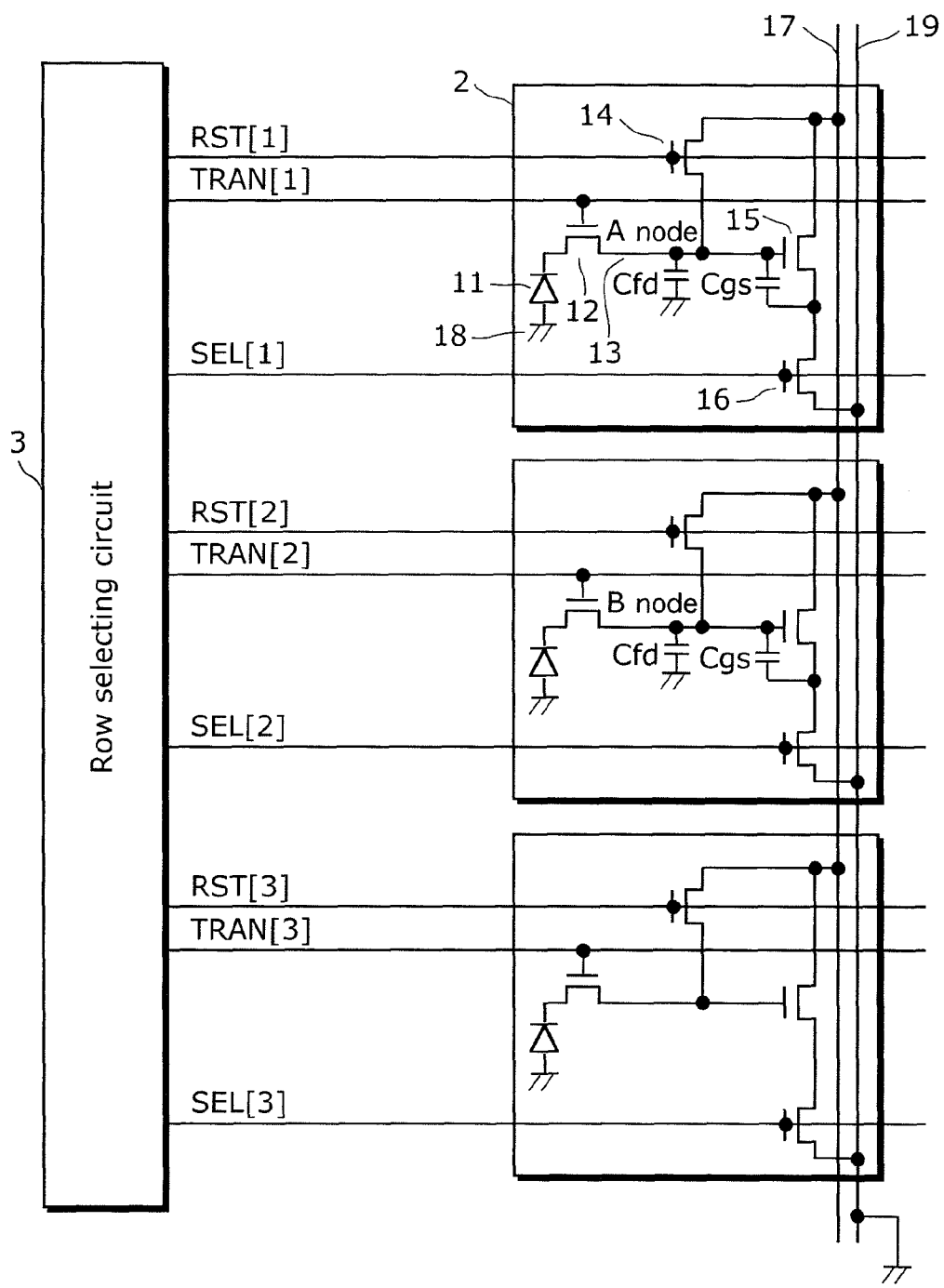
FIG. 2A shows in detail a structure of a pixel in the solid-state imaging device in accordance with the Embodiment 1.
Figure 2B:
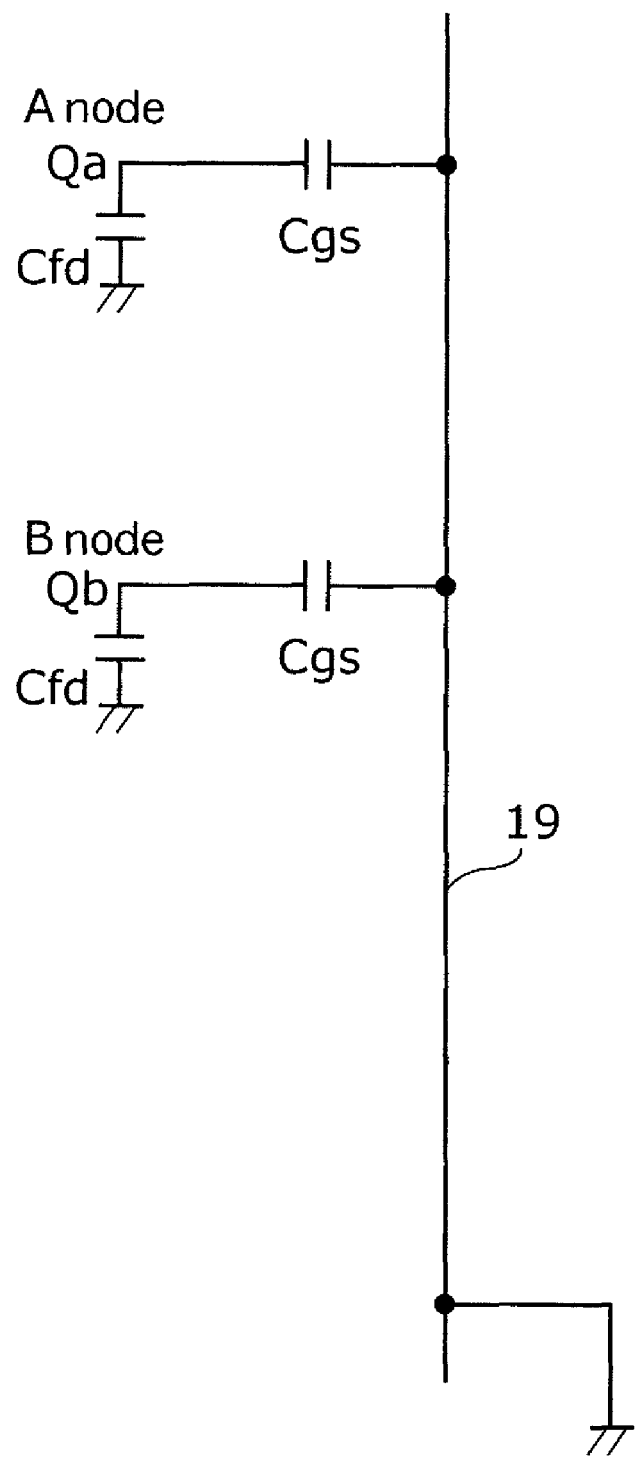
FIG. 2B shows an equivalent circuit diagram, in vertically adding two signals, in accordance with Embodiment 1 of the present invention.

FIG. 2 shows in detail a structure of the solid-state imaging device (a structure of the pixel 2) in accordance with Embodiment 1. FIG. 2B shows an equivalent circuit diagram, in vertically adding two signals, in accordance with Embodiment 1 of the present invention.

The pixel 2 is characterized to output, to a column signal line 19, a reset voltage to which a voltage in resetting is amplified and a read voltage to which a voltage in reading is amplified. As shown in FIG. 2A, the pixel 2 includes: a photodiode (PD) 11 which photoelectric-converts incident light, generates charge (signal charge), and accumulates the generated charge; an FD 13 which accumulates the charge generated by the PD 11 whose voltage changes based on the accumulated charge amount; a reset Tr 14 which resets a potential applied to the gate of an amplifying Tr 15; that is, resetting the voltage of the FD13, so that the reset voltage is an initial voltage (here, referred to as VDD) supplied via a power source line 17; a transfer transistor (Tr) 12 which is provided between the PD 11 and the amplifying Tr 15, and supplies the charge generated by the PD 11 to the FD 13 under the control of the row selecting circuit 3; the amplifying Tr 15 which has a gate to which a voltage is applied according to the charge of the PD 11, and outputs a voltage following, to change, the voltage of the FD 13; and a selecting Tr 16 which connects the output of the amplifying Tr 15 to the column signal line 19 when receiving a line-select signal from the column selecting circuit 3.

Figure 3:
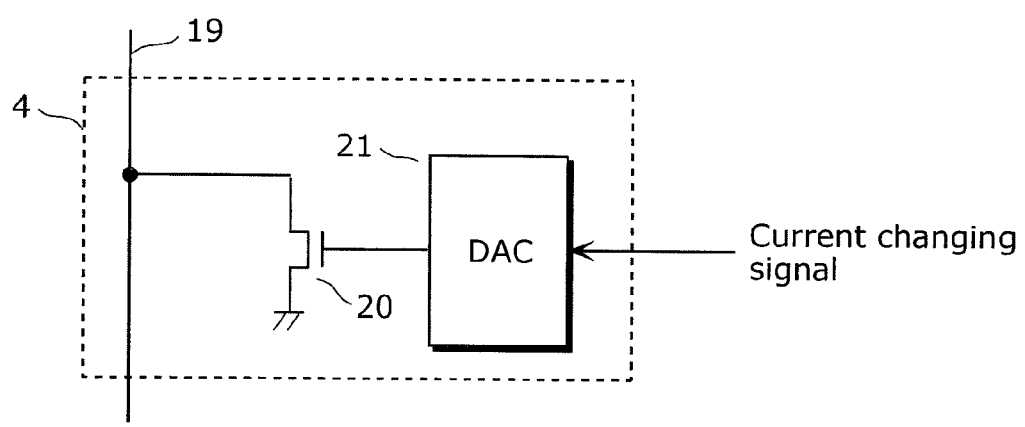
FIG. 3 shows in detail a structure of a pixel current source circuit in the solid-state imaging device in accordance with the Embodiment 1.

FIG. 3 shows in detail a structure of the solid-state imaging device (a structure of a pixel current source circuit 4) in accordance with Embodiment 1.

The pixel current source circuit 4 is provided to a corresponding one of column signal lines 19, and connected to the corresponding column signal line 19. Here, the pixel current source circuit 4 supplies to the connected column signal line 19 a constant current when the signal is outputted from the pixel 2 to the connected signal line 19. The column signal line 19 is provided to a corresponding one of the columns of the pixels 2, arranged on the corresponding one of the columns, and connected to the pixels 2 of the corresponding column. Here, the column signal line 19 transfers the signal outputted from the pixel 2.

The pixel current source circuit 4 includes a Tr 20 for supplying a pixel current to the column signal line 19, and a digital-analog converter (DAC) 21 for supplying to a gate of the Tr 20 a voltage based on the number of the mixed pixels. As an input of the DAC 21, supplied from the control unit 9 is a current changing signal based on the number of the mixed pixels.

Figure 4:
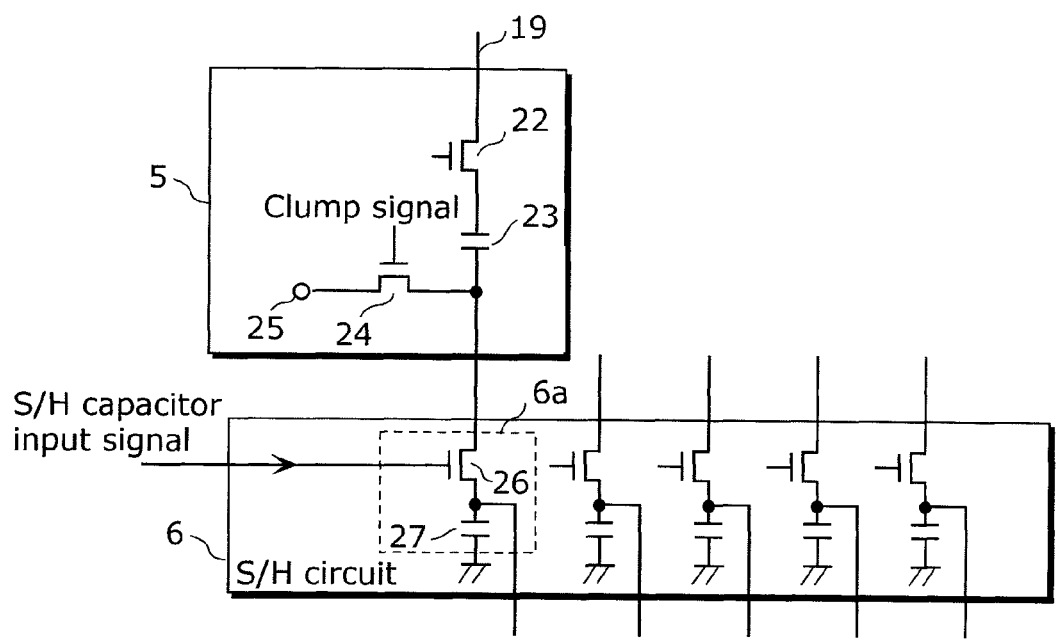
FIG. 4 shows in detail a structure of a column circuit in the solid-state imaging device in accordance with the Embodiment 1.

FIG. 4 shows in detail a structure of the solid-state imaging device (a structure of a column circuit including the clump circuit 5 and the S/H circuit 6) in accordance with Embodiment 1.

The column circuit (i) temporarily holds a signal indicating the difference between the reset voltage and the read voltage both outputted from the pixel 2, and (ii) outputs the temporarily held signal to the MUX 7.

The clump circuit 5 includes a sampling Tr 22, a clump capacitor 23, a clump voltage input terminal 25, and a clump Tr 24. The clump capacitor 23, having a capacity value "Ccl", obtains the difference between a reset signal and a read signal both outputted from the pixel 2; namely, a pixel signal. The clump voltage input terminal 25 is used for setting a potential of a terminal of the clump capacitor 23 to a clump potential (VCL), the terminal which is provided opposite a terminal connected to the pixel 2. The clump Tr 24 has a gate to which a clump signal is supplied.

The S/H circuit 6 includes an S/H capacitor 27, and an S/H capacitor input Tr 26. The S/H capacitor 27, having a capacity value "Csh", temporarily holds the pixel signal according to an S/H capacitor input signal supplied to the gate. The S/H capacitor input Tr 26 inputs the pixel signal to the S/H capacitor 27. The S/H circuit 6 is provided to a corresponding one of the columns on which the pixels 2 are arranged. The S/H circuit 6 includes arranged plural base units 6a each of which temporarily holds a pixel signal sent from the corresponding one of the columns.

Figure 5:
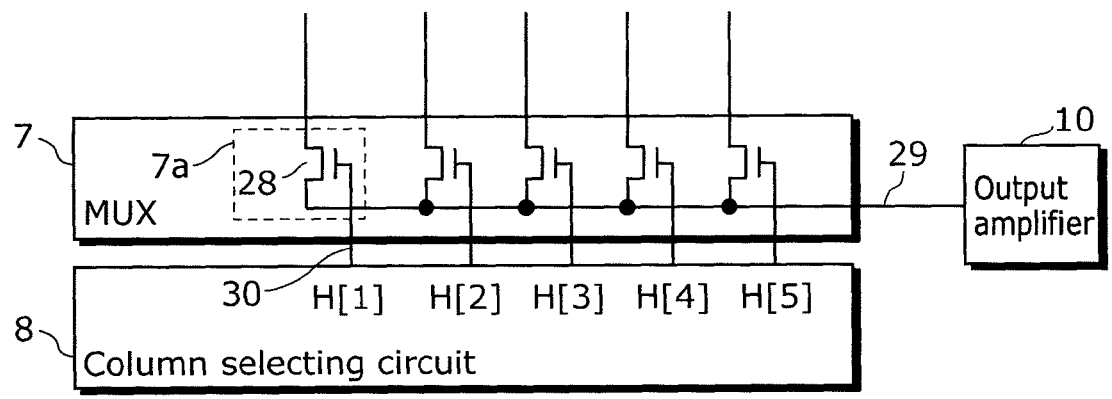
FIG. 5 shows in detail a structure of a multiplexer (MUX) in the solid-state imaging device in accordance with the Embodiment 1.

FIG. 5 shows in detail a structure of the solid-state imaging device (a structure on the periphery of the MUX 7) in accordance with Embodiment 1.

As shown in FIG. 5, the MUX 7 includes plural column selecting Trs 28 each provided between a corresponding one of the S/H capacitors 27 and a row common signal line 29. Each column selecting Tr 28 sequentially outputs to the row common signal line 29 the pixel signal held by the S/H capacitor 27 according to a column selecting signal (H[n]) supplied to a gate via a column selecting signal line 30. The row common signal line 29 transfers to the output amplifier 10 the pixel signals each outputted to a different column signal line 19. The pixel signal supplied to the output amplifier 10 via the row common signal line 29 is amplified and outputted out of the chip. The MUX 7 is provided to a corresponding one of the columns on which the pixels 2 are arranged. The MUX 7 includes arranged plural base units 7a each of which controls timing of outputting a pixel signal, on a corresponding one of the columns, to the row common signal line 29. The MUX 7, exemplifying a mixture circuit according to an implementation of the present invention, mixes the pixel signals each outputted to the different column signal line 19.

Here, a pixel reset signal (RST [n]), a charge transferring signal (TRAN [An]), and a row selecting signal (SEL [n]) are supplied to the pixel 2 at predetermined timing. Further, the clump signal, the S/H capacitor input signal, and the column selecting signal (H [n]) are supplied to a column circuit and the MUX 7 at predetermined timing. Then, the pixel 2, the column circuit, and the MUX 7, each turns on and off a transistor which corresponds to each of the control signals.

Described in detail next shall be a driving technique of the solid-state imaging device in accordance with Embodiment 1. It is noted that the solid-state imaging device in accordance with Embodiment 1 employs a progressive-scanning mode (a mode to output non-mixed pixel signals without the addition of the signals of the pixels 2) used for still-capturing on a camera, and a pixel mixture mode (a mode to mix the pixel signals to output with the signals of the pixels 2 added) used for live previewing on the camera.

Figure 6:
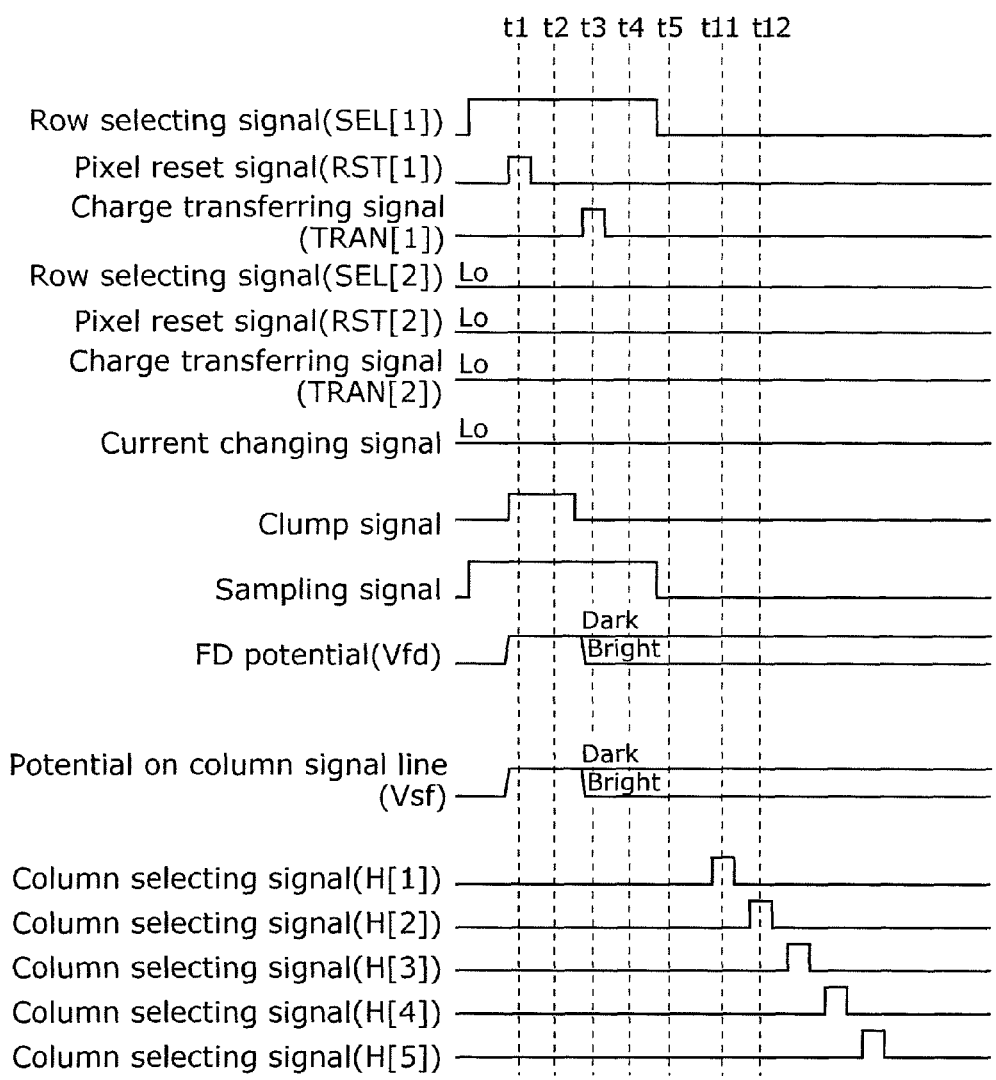
FIG. 6 is a timing chart showing timing of each control signal supplied to the pixel and the column circuit in a progressive-scanning mode employed in the solid-state imaging device in accordance with the Embodiment 1.

FIG. 6 is a timing chart showing timing of each control signal supplied to the pixel 2 and to the column circuit in the progressive-scanning mode employed in the solid-state imaging device in accordance with Embodiment 1. It is noted in FIG. 6 that the current changing signal is brought Lo, and a bias potential is outputted from the DAC 21 in order to generate a current value used for outputting non-mixed pixel signals; that is, a current value used for the progressive-scanning.

First, at timing "t1", TRAN [1] is brought to Lo, and RST [1] is brought to Hi. This turns a transfer Tr 12 off and a reset Tr 14 on. Accordingly, the potential ("Vfd") of the FD13 is reset to the FD reset potential "Vfdrst" (=VDD).

Next at timing "t2", TRAN [1] remains Lo and RST [1] is brought to Lo. This turns the transfer Tr 12 and the reset Tr 14 off. Accordingly, the reset state of the potential of the FD13 remains as it is.

Here, SEL [1] is Hi, and the selecting Tr 16 is on. Thus assuming that the threshold value voltage of the amplifying Tr 15 is "Vth", "Vfdrst−Vth" is outputted to the column signal line 19 as the reset voltage (Specifically, "Vfdrst−Vth−α". Here, "α" is omitted). In addition, the reset voltage "Vfdrst−Vth" is outputted to one terminal of the clump capacitor 23. Meanwhile, both of the clump signal and the S/H capacitor input signal are Hi. Here, potentials on (i) the other terminal of the clump capacitor 23 and (ii) one terminal of the S/H capacitor 27 are set to the VCL.

Then, at timing "t3", TRAN [1] is brought to Hi. This turns the transfer Tr on and then transfers the charge accumulated in the PD 11 to the FD13. Thus, the "Vfd" goes low by the voltage "Vfdsig", according to the amount of the signal charge of the FD13, to "Vfdrst−Vfdsig".

Then, at timing "t4", TRAN [1] is brought to Lo, and SEL [1] remains Hi. This turns the transfer Tr 12 off and the selecting Tr 16 on; accordingly, "Vfdrst−Vfdsig−Vth" is outputted to the column signal line 19 as the read voltage. This changes the input of the clump capacitor 23 by "Vfdsig"; accordingly, the output of the clump capacitor 23 also changes by "Vfdsig". Further, since the clump signal is Lo, and the clump Tr 24 is off, the potential on the other terminal of the clump capacitor 23 having the capacity value "Ccl"; that is the potential on the one terminal of the S/H capacitor 27 having the capacity value "Csh", changes as much as "Vfdsig×Ccl/(Ccl+Csh)". This potential change represents a voltage corresponding to the difference, on the column signal line 19, between the reset voltage and the read voltage; namely, the pixel signal. SEL [1] and the S/H capacitor input signal are brought to Lo at timing "t5". The pixel signal is accumulated in the S/H capacitor 27. The above operation intends to hold pixel signals for one row in the S/H circuit 6.

Next, at timing "t11", the H[1] is brought to Hi, and the column selecting Tr 28 in the base units 7a on the first column is turned on. This involves outputting, to the row common signal line 29, the pixel signal of the S/H capacitor 27 in the base unit 6a on the first column, and the outputted pixel signal is forwarded outside via the output amplifier 10.

Next, at timing "t12", the H[2] is brought to Hi, and the column selecting Tr 28 in the base units 7a on the second column is turned on. This involves outputting, to the row common signal line 29, the pixel signal of the S/H capacitor 27 in the base unit 6a on the second column, and the outputted pixel signal is forwarded outside via the output amplifier 10.

Similarly, the column selecting signals are sequentially brought to Hi, and the pixel signals of the S/H capacitors 27 in the base units 6a on each column are sequentially outputted to the row common signal line 29. The above operation involves sequentially outputting the pixel signals for one row. By repeating the above operation as many times as the number of the rows on which the pixels 2 are arranged, all the signals for the pixel 2 can be read.

Figure 7:
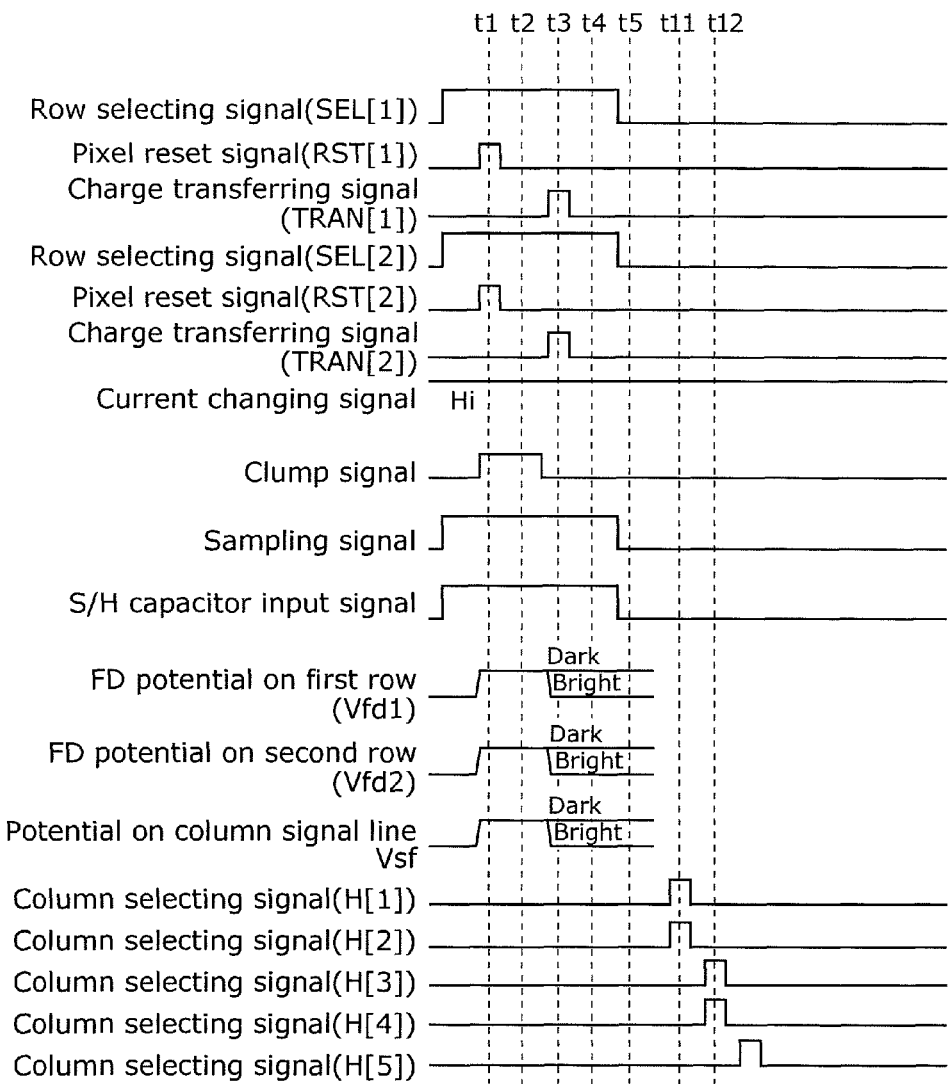
FIG. 7 is a timing chart showing timing of each control signal supplied to the pixel and the column circuit in a pixel mixture mode employed in the solid-state imaging device in accordance with the Embodiment 1, the pixel mixture mode which involves mixing two pixels in a column direction and two pixels in a row direction, totaling four pixels mixed.

FIG. 7 is a timing chart showing timing of each control signal supplied to the pixel 2 and the column circuit in a pixel mixture mode employed in the solid-state imaging device in accordance with Embodiment 1, the pixel mixture mode which involves mixing two pixels in a column direction and two pixels in a row direction, totaling four pixels mixed. It is noted in FIG. 7 that the current changing signal is Hi, and the bias potential is outputted from the DAC 21 in order to generate a current value used for outputting with the pixel signals mixed; that is, a current value used for the pixel mixture reading.

First, at the timing "t1", both of the row selecting signals SEL and SEL [2] are Hi, and the pixels 2 on the first and the second rows are selected. In addition, both of TRAN [1] and TRAN [2] are Lo, and both of RST [1] and RST [2] are Hi. Accordingly, the transfer Tr 12 is off and the reset Tr 14 is on in each pixel 2 on the first and the second rows. Here, "Vfd" is reset to the FD reset potential "Vfdrst" (="VDD").

Next, at the timing "t2", both of TRAN [1] and TRAN [2] remain Lo, and both of RST [1] and RST [2] are brought to Lo. This turns the transfer Tr 12 and the reset Tr 14 off in each pixel 2 on the first and the second rows. Accordingly, the reset state of the potential of the FD13 remains.

Here, both of SEL [1] and SEL [2] are Hi, and each selecting Tr 16 is on in the pixel 2 on the first and the second rows. Thus, "Vfdrst−Vth" is outputted to the column signal line 19 as the reset voltage (Specifically, "Vfdrst−Vth−α". Here, "α" is omitted). In addition, the reset voltage "Vfdrst−Vth" is outputted to the one terminal of the clump capacitor 23. Meanwhile, both of the clump signal and the S/H capacitor input signal are Hi. Here, potentials on (i) the other terminal of the clump capacitor 23, and (ii) the one terminal of the S/H capacitor 27 are set to the VCL.

Then, at the timing "t3", TRAN [1] and TRAN [2] are brought to Hi. This turns on the transfer Tr 12 in each pixel 2 provided on the first and the second rows, and then transfers the charge accumulated in the PD11 to the FD13. Accordingly, the potential ("Vfd 1") of the FD13 in the pixel 2 on the first row and the potential ("Vfd 2") of the FD 13 in the pixel 2 on the second row go low by the voltages "Vfdsig 1" and "Vfdsig 2", respectively, according to the signal charge amount of the corresponding PDs 11. The resulting voltages are "Vfdrst−Vfdsig 1" and "Vfdrst−Vfdsig 2".

Then, at the timing "t4", both of TRAN [1] and TRAN [2] are brought to Lo, and both of SEL [1] and SEL [2] remain Hi. This turns off the transfer Tr 12 and on the selecting Tr 16 in each of pixel 2 provided on the first and the second rows. Assuming "Vfdsig" is the average between "Vfdsig 1" and "Vfdsig 2", "Vfdrst−Vfdsig−Vth" is outputted to the column signal line 19 as the read voltage. Further, the potential change of the column signal line 19 causes a change of the input of the clump capacitor 23 by "Vfdsig". Here, the clump signal is Lo, and the clump Tr 24 is off; accordingly, the clump Tr 24 is off, and the potential on the other terminal of the clump capacitor 23 changes by "Vfdsig×Cci/(Ccl+Csh)", the potential which is the potential on the one terminal of the S/H capacitor 27.

The read voltage represents a mixed signal including the pixel signals on the first and the second rows. Details of the pixel signal mixture operation on the column signal line 19 shall be described with reference to FIGS. 8A, 8B, and 9A.

This potential change represents a voltage corresponding to the difference, on the column signal line 19, between the reset voltage and the read voltage; namely, a pixel signal (a column pixel mixture signal) with the pixel signals on the first and the second rows averaged. Here, at the timing "t5", SEL [1], SEL [2], and the S/H capacitor input signal are brought to Lo and the potential change is accumulated in the S/H capacitor 27.

Next, at the timing "t11", both of H [1] and H[2] are brought to Hi, and the column selecting Tr 28 in each base unit 7a provided on the first column and the column selecting Tr 28 in each base unit 7a provided on the second column are turned on. This involves outputting, to the row common signal line 29, an average signal between (i) the pixel signal of the S/H capacitor 27 in each base unit 6a on the first column and (ii) the pixel signal of the S/H capacitor 27 in each base unit 6a on the second column. The outputted average signal is outputted outside via the output amplifier 10.

Next, at the timing "t12", both of H [3] and H[4] are brought to Hi, and the column selecting Tr 28 in the base unit 7a provided on the third column and the column selecting Tr 28 in the base unit 7a provided on the fourth column are turned on. This involves outputting, to the row common signal line 29, an average signal between (i) the pixel signal of the S/H capacitor 27 in the base unit 6a on the third column, and (ii) the pixel signal of the S/H capacitor 27 in the base unit 6a on the fourth column. The outputted average signal is outputted outside via the output amplifier 10.

Similarly, the column selecting signals are sequentially brought to Hi, and the pixel signals of the S/H capacitors 27 in the base units 6a on each column are sequentially outputted to the row common signal line 29. The above operation involves sequentially outputting signals each of which has the pixel signals with two pixels in a column direction and two pixels in a row direction, totaling four pixels, mixed. By repeating the above operation half as many times as the number of rows on which the pixels 2 are arranged, all the signals in the pixels 2 can be read.

As described above, mixing the pixel signals on the column signal line 19 makes possible reading the pixel signals from plural pixels 2 to send to the column circuit just once, which enables high-speed reading. Further, just one S/H capacitor 27 is employed in the structure, which realizes an effective structure in chip downsizing and cost reduction.

Here, a column amplifying circuit may be provided between the pixel current source circuit 4 and the clump circuit 5, which realizes an effect similar to the above. In addition, some of the structural elements shown in FIG. 1, such as the DAC 21 included in the pixel current source circuit 4 and the control unit 9, may be formed on a semiconductor chip different from the imaging area 1.

Figure 8A:
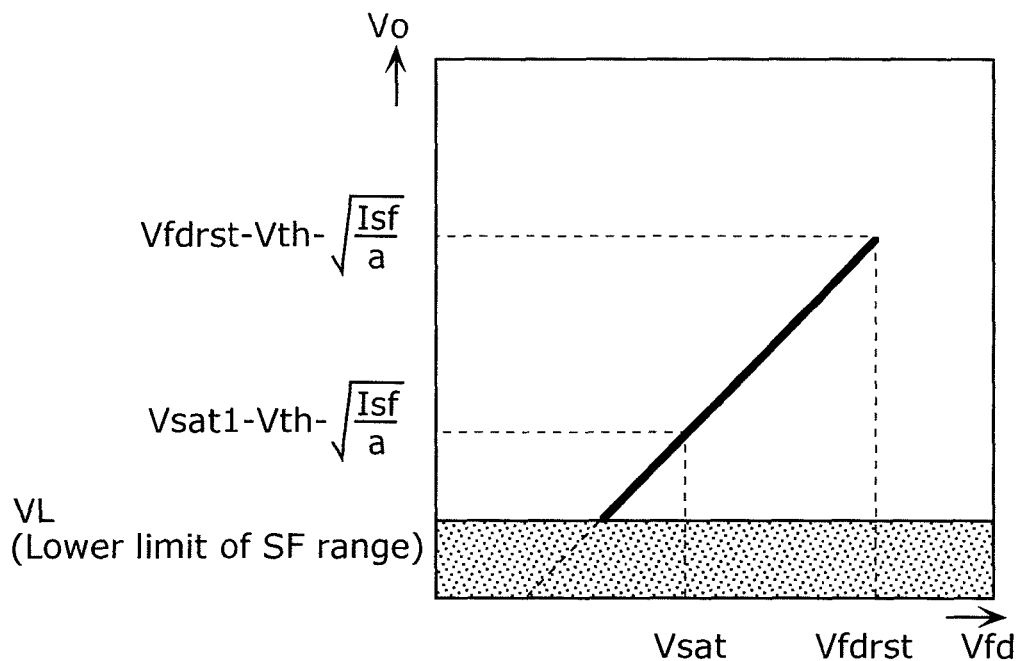
FIG. 8A shows a relationship between "Vfd" and "Vo" at timing "t4" in the progressive-scanning mode in FIG. 6 employed in the solid-state imaging device in accordance with the Embodiment 1.

Described next is the details of an operation of a pixel source follower (SF) at the timing "t4" in the progressive-scanning mode shown in FIG. 6 with reference to FIGS. 8A and 6, the pixel SF which includes the amplifying Tr 15 and the pixel current source circuit 4. FIG. 8A shows a relationship between an output potential of a pixel SF ("Vo") and "Vfd" at the timing "t4" in the progressive-scanning mode shown in FIG. 6.

The relationship between "Vfd" and "Vo" is expressed in Equations (1) and (2) shown below:

$$Vo=Vfd-Vth-(Ish/a)^{1/2} \quad (1)$$

$$a=(1/2) \times (W/L) \times \mu_{eff} \times Cox \quad (2)$$

Here, "Vth", "W", "L", "peff", and "Cox" respectively represent a threshold value voltage, a gate width, a gate length, a carrier mobility, and a film thickness of gate oxide in the amplifying Tr 15. "Isf" represents a current value of the pixel current source circuit 4 in the progressive-scanning mode. In a precise sense, the change of "Vo" causes the change of the source of the amplifying Tr 15-substrate potential, followed by the change of "Vth"; however, "Vth" is assumed as a fixed value here. "Vo" is a value obtained by subtracting a fixed value from "Vfd", which indicates a liner characteristic. Here, the fixed value changes depending on the magnitude of "Isf".

At the timing "t2" in FIG. 6, "Vfd" is set to the initial value "Vfdrst". At the timing "t3" in FIG. 6, the accumulated charge of the PD 11 is transferred to the FD 13, and thus the value of "Vfd" goes low. By detecting the difference "Vo" between the potentials of the two FDs 13 with a use of the column circuit, the pixel signal is detected.

Assume "Vfd" found when the number of saturated electrons in the PD 11 is transferred to the FD 13 as "Vsat". The difference between "Vsat" and "Vfdrst" is a usage range of the FD 13. Considering the output side of the pixel SF, meanwhile, a too-low potential of the FD 13 causes the Tr 20 in the pixel current source circuit 4 to be inoperative in a saturated area, resulting in failing to obtain the liner characteristic. This means that "Vo" has a lower limit "VL", and thus "Vo" needs to satisfy the relationship "Vo≧VL". "Vo" is minimum where "Vfd" is "Vsat". Thus, "VL" needs to satisfy the relationship represented by the equation (3) shown below.

$$Vsat-Vth-(Isf/a)^{1/2} \geq VL \quad (3)$$

This means that "Isf" has the maximum value obtained by the equation (4) shown below.

$$Isf(\max)=a \times (Vsat-Vth-VL)^2 \quad (4)$$

Figure 8B:
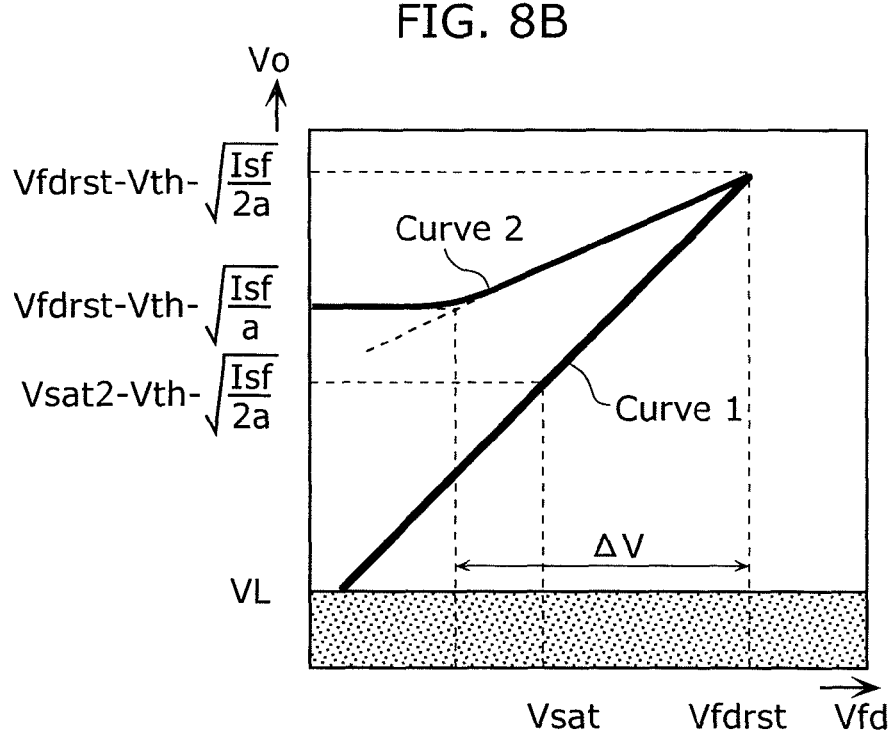
FIG. 8B shows relationships between "Vfd1" and "Vo" and between "Vfd2" and "Vo" at the timing "t4" in the pixel mixture mode in FIG. 7 employed in the solid-state imaging device in accordance with the Embodiment 1, the pixel mixture mode which involves mixing pixel signals of two pixels in a column direction.

Described next with reference to FIGS. 8B and 7 are details of the operation on the pixel SF at the timing "t4" in the pixel mixture mode shown in FIG. 7. FIG. 8B shows relationships between the FD potential ("Vfd1") of the pixel 2 provided on the first row and "Vo", and between the FD potential ("Vfd2") of the pixel 2 provided on the second row and "Vo" at the timing "t4" in the pixel mixture mode shown in FIG. 7. In FIG. 8B, a curve 1 shows a characteristic of "Vo" where "Vfd1=Vfd2" is held. A curve 2 shows a characteristic of "Vo" where: "Vfd2" is fixed to "Vfdrst" and; only "Vfd1" is changed.

The characteristic of "Vo" where "Vfd1=Vfd2" is held is similar to that observed in the progressive-scanning mode (when the pixel signals are not mixed). The characteristic is represented by the equation (5) shown below.

$$Vo=Vfd-Vth-(Ish/2a)^{1/2} \quad (5)$$

Here, however, an amount of the voltage reduction goes smaller. This is because two amplifying Trs 15 are found in the pixel SF, and thus an effective "W" doubles. Hence, due to the restriction by the lower limit of "Vo" as observed in the progressive-scanning mode, found in "Isf" is the maximum value obtained by the equation (6) below.

$$Isf(\max)=2 \times a(Vsat-Vth-VL)^2 \quad (6)$$

In the curve 2, meanwhile, when "Vfd" goes low from "Vfdrst", "Vo" shows the liner characteristic within a certain range. Accordingly obtained is an output corresponding to the average between "Vfd1" and "Vfd2". When "Vo" gets closer to "Vfdrst-Vth-(Isf/a)^{1/2}", however, "Vo" stops going low. When the lowering of "Vo" is saturated, currents separately running into the amplifying Trs 15 in two pixels 2 in the beginning are to all run into the amplifying Tr 15 in a single pixel 2 (the pixel 2 having higher "Vfd"). This determines an operable range ΔV, of the FD13, represented by the equation (7a) below.

$$\Delta V = 2 \times \{(Vfdrst - Vth - (Ish/2a)^{1/2}) - (Vfdrst - Vth - (Ish/a)^{1/2})\} \quad (7a)$$

Hence, ΔV is calculated by the equation (7b) shown below.

$$\Delta V = (2 - \sqrt{2}) \times (Isf/a)^{1/2} \quad (7b)$$

Here, ΔV needs to be greater than the usage range ("Vfdrst−Vsat"), of the FD13, determined by the number of saturated electrons in the PD 11. Thus, ΔV has to satisfy the condition derived from the following equation (8).

$$(2 - \sqrt{2}) \times (Isf/a)^{1/2} \geq Vfdrst - Vsat \quad (8)$$

This means that a lower limit value "Isf (min)" calculated with the following equation (9) is found in the current value "Isf".

$$Isf(\min) = \{1/(2 - \sqrt{2})^2\} \times a \times (Vfdrst - Vsat)^2 \quad (9)$$

Figure 9A:
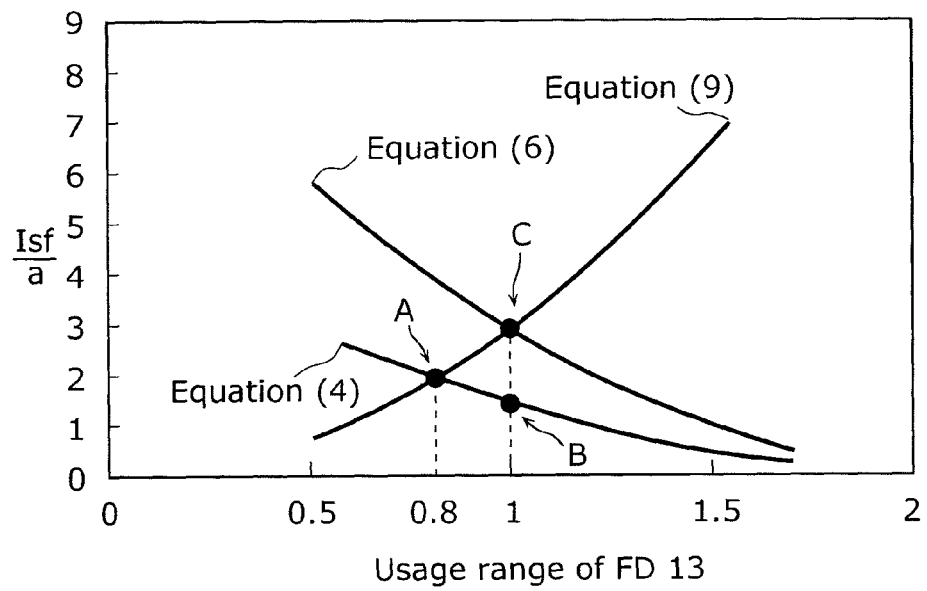
FIG. 9A shows a relationship between an available range of an FD and "Isf/a" in (i) the progressive-scanning mode, and (ii) the pixel mixture mode both employed in the solid-state imaging device in accordance with the Embodiment 1, the pixel mixture mode which involves mixing the pixel signals of two pixels in a column direction.

FIG. 9A shows a relationship between the usage range ("Vfdrst−Vsat") of the FD13 and "Isf/a" where (i) the source voltage is 3.3V, and (ii) a typical voltage condition; that is Vfdrst=3.3V, "Vth=0.5V", and "VL=0.6V", is held.

When the same "Isf" is assumed in the progressive-scanning mode and in the pixel mixture mode, the maximum usage range of the FD13 is 0.8V ("A" in FIG. 9A). In the case where the value of "Isf" is changed between the progressive-scanning mode and the pixel mixture mode so as to be set to a greater "Isf" value in the pixel mixture mode, the usage range of the FD13 expands up to 1.0V ("B" and "C" in FIG. 9A).

This means that, in either mode, the usage range of the FD13 is secured up to 1.0V by the pixel current source circuit 4 employing "Isf1" in the progressive-scanning mode and; "Isf2" ("Isf2=2.0×Isf1"), which is greater than "Isf1", in the pixel mixture mode. Accordingly, this makes possible obtaining a picture with high quality.

It is noted that even though the values of "Vfdrst", "Vsat", and "VL" change, the positional relationships between the three curbs in FIG. 9A remain the same. Thus, changes of the source voltage and a character of the transistor included in the pixel SF make no difference in relationship between current setting of the pixel current source circuit 4 and the usage range of the FD13.

Figure 8C:
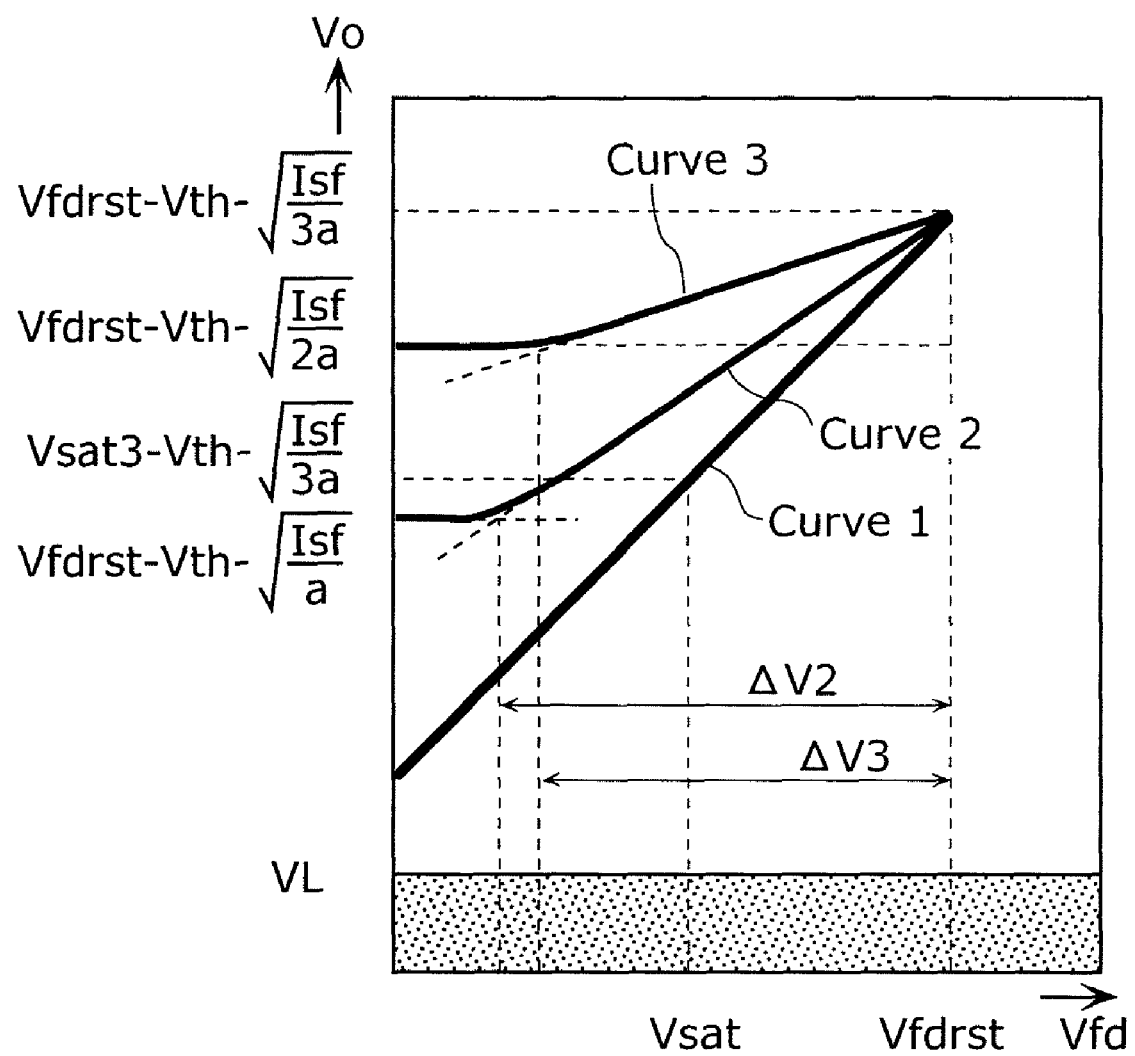
FIG. 8C shows relationships between: "Vfd1" and "Vo"; "Vfd2" and "Vo"; and; "Vfd3" and "Vo" in a pixel mixture mode employed in the solid-state imaging device in accordance with the Embodiment 1, the pixel mixture mode which involves mixing pixel signals of three pixels in a column direction.

Considered next is the case where the pixel signals of three pixels are mixed in a column direction. FIG. 8C shows relationships between the potential ("Vfd1") of the FD13 in the pixel 2 on the first row, the potential ("Vfd2") of the FD13 in the pixel 2 on the second row, and the potential ("Vfd3") of the FD13 in the pixel 2 on the third row. FIG. 8C shows the following characteristics: the curve 1 represents a characteristic of "Vo" where "Vfd1=Vfd2=Vfd3" is held; the curve 2 represents a characteristic of "Vo" where "Vfd3" is fixed to "Vfdrst", and both of the "Vfd1" and "Vfd2" are changed; and the curve 3 represents a characteristic of "Vo" where both of "Vfd2" and "Vfd3" are fixed to "Vfdrst", and only "Vfd1" is changed.

The characteristic of "Vo" where "Vfd1=Vfd2=Vfd3" is held is similar to that observed in the progressive-scanning mode. The characteristic is represented by the equation (10) shown below.

$$Vo = Vfd - Vth - (Ish/3a)^{1/2} \quad (10)$$

Here, however, an amount of voltage reduction goes smaller. This is because three amplifying Trs 15 are found in the pixel SF, and an effective "W" triples. Hence, due to the restriction by the lower limit of "Vo" as observed in the progressive-scanning mode, found in "Isf" is the maximum value represented by the equation (11) below.

$$Isf(\max) = 3 \times a \times (Vsat - Vth - VL) \quad (11)$$

Meanwhile, when "Vfd1" and "Vfd2" go low from "Vfdrst" in the curve 2, "Vo" shows the liner characteristic within a certain range. Accordingly obtained is an output corresponding to the average among "Vfd1", "Vfd2", and "Vfd3". When "Vo" gets closer to "Vfdrst−Vth−(Isf/a)^{1/2}", however, "Vfd1" and "Vfd2" stop going low. When the lowering of "Vo" is saturated, currents separately running into the amplifying Trs 15 in three pixels 2 in the beginning are to all run into the amplifying Tr 15 in a single pixel 2 (the pixel 2 having higher "Vfd"). This determines an operable range ΔV2, of the FD13, represented by the equation (12) below.

$$\Delta V2 = \{(3 - \sqrt{3})/2\} \times (Isf/a)^{1/2} \quad (12)$$

Meanwhile, when "Vfd1" goes low from "Vfdrst" in the curve 3, "Vo" shows the liner characteristic within a certain range. Accordingly obtained is an output corresponding to the average among "Vfd1", "Vfd2", and "Vfd3". When "Vo" gets closer to "Vfdrst−Vth−(Isf/2a)^{1/2}", however, "Vfd1" stops going low. When the lowering of "Vo" is saturated, currents separately running into the amplifying Trs 15 in three pixels 2 in the beginning are to all run into the amplifying Trs 15 in two pixels 2 (the pixels 2 having higher "Vfd"). This determines an operable range ΔV3, of the FD13, represented by the equation (13) below.

$$\Delta V3 = 3 \times \{(1/\sqrt{2}) - (1/\sqrt{3})\} \times (Isf/a)^{1/2} \quad (13)$$

Since "ΔV3<Δ2" is held here, ΔV3 needs to be greater than the usage range ("Vrst−Vsat"), of the FD13, determined by the number of the PD saturated electrons. Hence, the expression (14) below has to be satisfied.

$$3 \times \{(1/\sqrt{2}) - (1/\sqrt{3})\} \times (Isf/a)^{1/2} > Vfdrst - Vsat \quad (14)$$

This means that the lower limit value "Isf (min)" calculated with the following equation (15) is found in the current value "Isf".

$$Isf(\min) = \{\sqrt{2}/(3 - \sqrt{6})\}^2 \times a \times (Vfdrst - Vsat)^2 \quad (15)$$

Figure 9B:
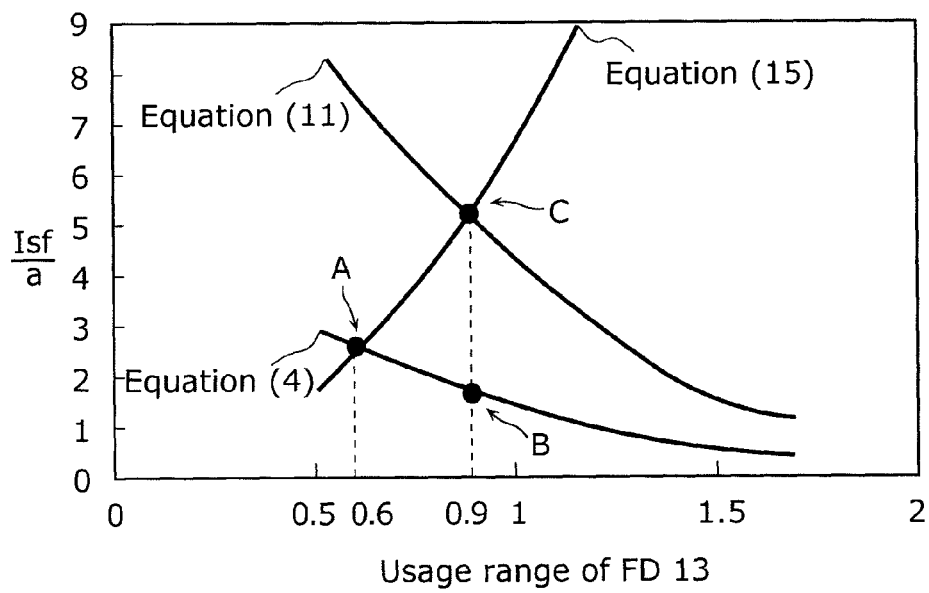
FIG. 9B shows a relationship between an available range of the FD and "Isf/a" in (i) the progressive-scanning mode, and (ii) the pixel mixture mode both employed in the solid-state imaging device in accordance with the Embodiment 1, the pixel mixture mode which involves mixing the pixel signals of three pixels in a column direction.

FIG. 9B shows a relationship between the usage range ("Vfdrst−Vsat") of the FD13 and "Isf/a" where (i) the source voltage is 3.3V, and (ii) "Vrst=3.3V", "Vth=0.5V", and "VL=0.6V" are held.

When the same "Isf" is assumed in the progressive-scanning mode and in the pixel mixture mode, the maximum usage range of the FD13 is 0.6V ("A" in FIG. 9B). In the case where the value of "Isf" is changed between the progressive-scanning mode and the pixel mixture mode so as to be set to a greater "Isf" value in the pixel mixture mode, the usage range of the FD13 expands up to 0.9V ("B" and "C" in FIG. 9B).

This means that, in either mode, the usage range of the FD13 is secured up to 0.9V by the pixel current source circuit 4 employing: "Isf1" in the progressive-scanning mode; and "Isf3" ("Isf3=3.2×Isf1"), which is greater than "Isf1", in the pixel mixture mode. Accordingly, this makes possible obtaining a picture with high quality.

It is noted that even though the values of "Vfdrst", "Vsat", and "VL" change, the positional relationships between the three curbs in FIG. 9B remain the same. Thus, changes of the source voltage and a character of the transistor included in the pixel SF makes no difference in relationship between current setting of the pixel current source circuit 4 and the usage range of the FD13.

In the solid-state imaging device in accordance with Embodiment 1, the inputting unit of the pixel SF (source follower) is electrically floating in a signal obtaining status. In the pixel mixture mode which involves mixing the pixel signals, an input signal (signal charge) of one pixel SF modulates an input signal of another pixel SF (i) via the capacitor formed between the gate and the channel in the one pixel SF, and (ii) through the capacitor formed between the gate and the channel of the other pixel SF which is simultaneously accessed. In other words, plural input signals of accessed plural pixel SFs mutually modulate. Thus, in the solid-state imaging device in accordance with Embodiment 1, (i) only the signal having the greatest signal voltage can be outputted even though the plural pixel SFs are connected in parallel in the pixel mixture mode, and (ii) outputs from the plural pixel SFs can be (weighted) averaged in the voltage area even in simultaneously driving the plural pixel SFs. It is noted that the current flowing into the pixel SFs is preferably large for the solid-state imaging device in accordance with the present invention.

To simplify the description, assumed above is that the potential of the FD 13 is fixed after the signal charge is transferred from the PD 11. Actually, however, the FD potential is electrically floating. In the pixel mixture mode which involves mixing the pixel signals, an input signal (signal charge) of one pixel SF modulates an input signal of another pixel SF (i) via the capacitor formed between the gate and the channel in the one pixel SF, and (ii) through the capacitor formed between the gate and the channel in the other pixel SF which is simultaneously accessed. In other words, plural input signals of accessed plural pixel SFs mutually modulate. This works to enlarge the operating range, which means that the outputs from the plural pixel SFs can be weighted-averaged even in an area having a small operating current. When mixing the pixels, for example, provided to the column signal line 19 is an average value (Qa+Qb)/2 of the charge "Qa" of the Ath row and the charge "Qb" of the A+1th row under the condition where: gate capacity of amplifying Tr 15 (Cgs) >>capacity of FD 13 (Cfd).

As described above, the solid-state imaging device in accordance with Embodiment 1 (i) changes the current values (Isf) of the pixel current source circuit 4 in the pixel mixture mode mixing the pixel signals and in the progressive-scanning mode with no pixel signals mixed, and then (ii) sets the current value of the pixel current source circuit 4 to the most suitable value. This allows the solid-state imaging device to secure a wide dynamic range for the FD 13 in both of the progressive-scanning mode and the pixel mixture mode, which realizes a high-quality image.

Further, instead of accumulating in each S/H capacitor 27 the pixel signal for each row to mix the pixel signals on the row common signal line 29, the solid-state imaging device in accordance with Embodiment 1 mixes the outputs from the plural pixels 2 on the column signal lines 19. This enables the solid-state imaging device to perform a high-speed pixel mixture operation. In addition, the solid-state imaging device can suppress deterioration of the picture quality due to a narrowing dynamic range in the pixel 2 by changing the current value of the pixel current source circuit 4 to the most suitable value in both of the progressive-scanning mode and the pixel mixture mode.

Moreover, the equations (7) and (13) clarify that the solid-state imaging device in accordance with Embodiment 1 can secure the operable range of the FD 13 by making "a=(½)× (W/L)×μeff×Cox" smaller in the pixel mixture mode, as well as by changing "Isf". In the solid-state imaging device, for example, plural amplifying Trs 15, each of which is (i) connected to the same FD 13, and (ii) outputs a voltage following, to change, the voltage of the FD 13, are arranged in a single pixel 2. Here, each amplifying Tr 15 is different in transistor size; that is, at least one of gate width "W", gate length "L", "W/L", and thickness of the gate oxide film "Cox". The solid-state imaging device: determines which plural amplifying transistors included in the pixels 2 are turned on, the pixels 2 which have been simultaneously driven, according to the number of rows, by the row selecting circuit 3; and turns on one of the amplifying transistors included in the driven pixel cells. When the row selecting circuit 3 simultaneously drives the pixels 2 arranged on the same row, a transistor having either: a smaller ratio of the gate width with respect to the gate length of the driven pixels 2; or a greater gate oxide film in film thickness is turned on. When the row selecting circuit 3 simultaneously drives the pixels 2 arranged on the rows, a transistor having either: a greater ratio of the gate width with respect to the gate length of the driven pixels 2; or a smaller gate oxide film in film thickness is turned on. Specifically, the solid-state imaging device can secure a wide dynamic range for the FD 13 by causing (i) the control unit 9 to select one of the plural amplifying Trs 15 in the one pixel 2, so that either "W/L" (gate width/gate length) or "Cox" is smaller (the film thickness of the gate oxide is thicker) in the pixel mixture mode than in the progressive scanning mode, and (ii) the selected amplifying Tr 15 to output the signal voltage. Here, the control unit 9 selects the amplifying Tr 15 according to the number of rows to be simultaneously selected by the row selecting circuit 3. When the row selecting circuit 3 selects just one row, the control unit 9 selects an amplifying Tr 15 with at least one of "W", "L", "W/L", and "Cox" small. When the row selecting circuit 3 simultaneously selects plural rows, the control unit 9 selects an amplifying Tr 15 with at least one of "W", "L", "W/L", and "Cox" great.

Embodiment 2

Described hereinafter in detail is a solid-state imaging device in accordance with Embodiment 2 of the present invention, with reference to the drawings. It is noted that Embodiment 2 describes only the differences between the solid-state imaging device in accordance with Embodiment 2 and that in accordance with Embodiment 1 of the present invention. The parts other than the described differences share the same characteristics as those in Embodiment 1 of the present invention. The solid-state imaging device in accordance with Embodiment 2 is different from that in accordance with Embodiment 1 in structure of the pixel current source circuit.

Figure 10:
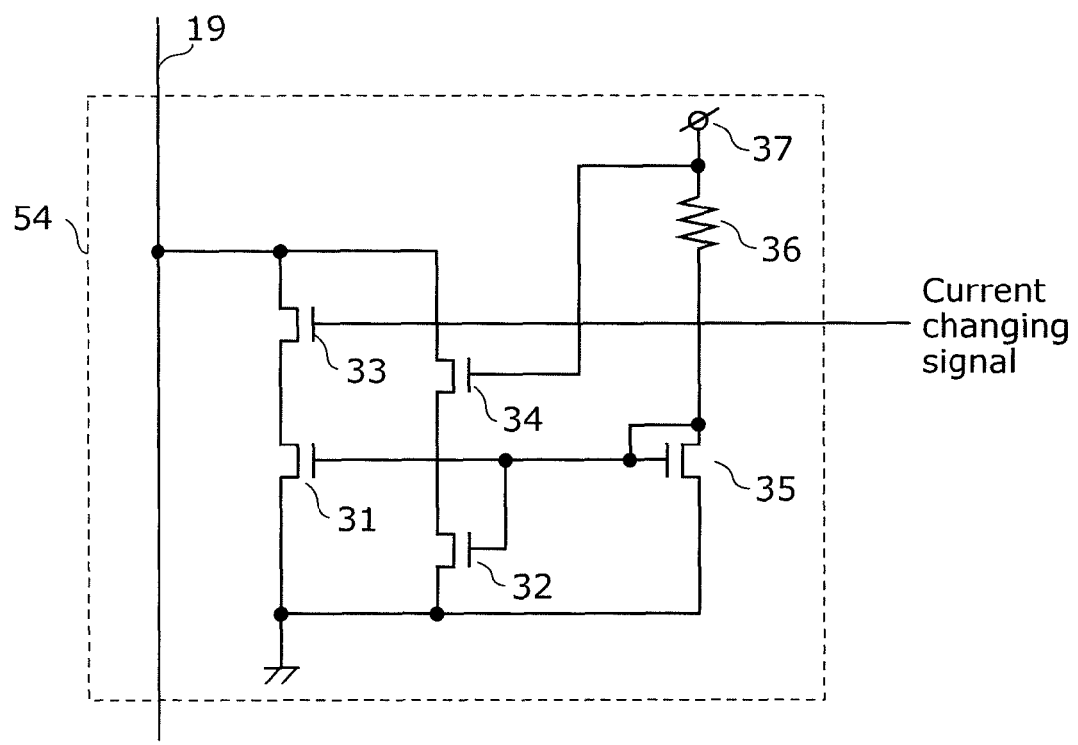
FIG. 10 shows in detail a structure of a pixel current source circuit in a solid-state imaging device in accordance with an Embodiment 2 of the present invention.

FIG. 10 shows in detail a structure of the solid-state imaging device (a structure of a pixel current source circuit 54) in accordance with Embodiment 2.

As shown in FIG. 10, the pixel current source circuit 54 includes: a power source 37; a resistor 36; a current mirror having Trs 35, 32, and 31; a Tr 33 which is on-off controllable with a current changing signal; and a Tr 34 which is always on regardless of the current changing signal.

In the pixel current source circuit 54 structured above, the current changing signal is Hi and the Tr 33 turns on in the pixel mixture mode. As a result, the current value of the pixel current source circuit 4 can increase in the pixel mixture mode.

It is noted in the solid-state imaging device in accordance with Embodiment 2 that the pixel current source circuit 54 changes current values in two kinds; meanwhile, the pixel current source circuit 4 can change current values among three kinds or more by having the larger number of stages in the current mirror.

Embodiment 3

Described hereinafter in detail is a solid-state imaging device in accordance with Embodiment 3 of the present invention, with reference to the drawings. It is noted that Embodiment 3 describes only the differences between the solid-state imaging device in accordance with Embodiment 3 and that in accordance with Embodiment 1 of the present invention. The parts other than the described differences share the same characteristics as those in Embodiment 1 of the present invention.

Figure 11:
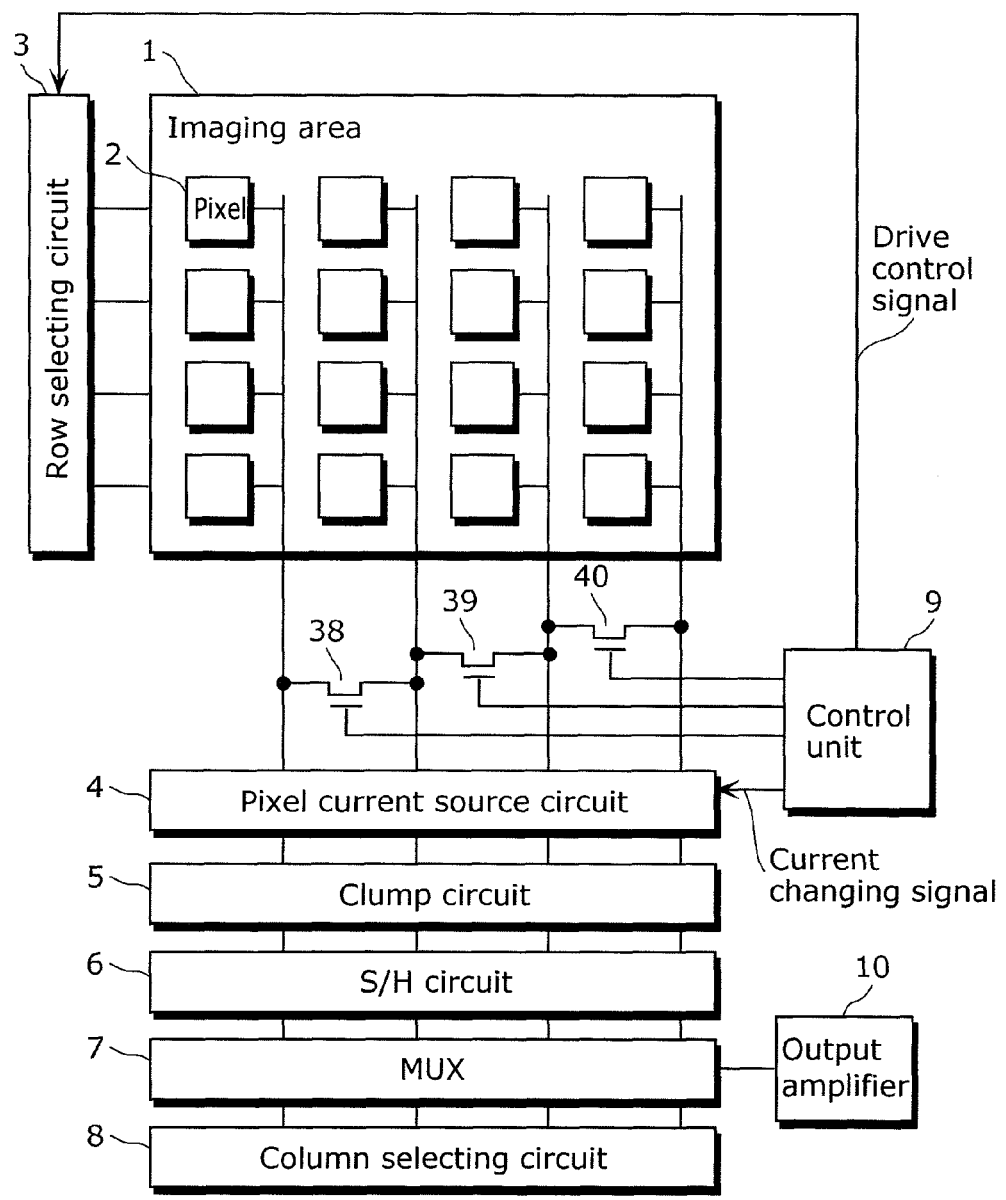
FIG. 11 shows an overall structure of a solid-state imaging device in accordance with an Embodiment 3 of the present invention.

FIG. 11 shows an overall structure of the solid-state imaging device in accordance with Embodiment 3.

As shown in FIG. 11, the solid-state imaging device includes the imaging area 1, the row selecting circuit 3, the pixel current source circuit 4, the clump circuit 5, the S/H circuit 6, the MUX 7, the column selecting circuit 8, the control unit 9, the output amplifier 10, the row common signal line (not shown), and Trs 38, 39, and 40 for mixing in a row direction.

Each of the Trs 38, 39, and 40 for mixing in a row direction, exemplifying a switch according to an implementation of the present invention, switches connection and disconnection between different column signal lines (neighboring column signal lines). The control unit 9 controls the row selecting circuit 3, so that (i) the Trs 38, 39, and 40 for mixing in a row direction and (ii) the transfer transistors included in the pixel cells, arranged on the rows, simultaneously driven by the row selecting circuit 3 are basically simultaneously turned on at a timing at which the outputs are provided from the pixels 2 to the column signal line. When the row selecting circuit 3 simultaneously drives the pixels 2 arranged on a same row, the control unit 9 controls the row selecting circuit 3 so that (i) the source follower circuit having multi-inputs and a single-output includes (a) the amplifying transistors in the pixels 2 connected via the Trs 38, 39, and 40 for mixing in a row direction and the column signal line, the connected pixels 2 being included in the pixels 2 arranged on the same row and (b) the pixel current source circuit 4 connected with the outputs of the amplifying transistors in the pixels 2 connected via the column signal line, and (ii) the source follower circuit weighted-averages in a voltage area outputs of the pixels 2 connected via the column signal line, and to provide the weighted-averaged outputs to the column signal line. When the row selecting circuit 3 simultaneously drives the pixels 2 arranged on rows, the control unit 9 controls the row selecting circuit 3 so that (i) the source follower circuit having multi-inputs and a single-output includes (a) the amplifying transistors in the pixels 2 connected via the Trs 38, 39, and 40 for mixing in a row direction and the column signal line, the connected pixels 2 being included in the pixels arranged on the rows, and (b) the pixel current source circuit 4 connected with outputs of the amplifying transistors in the pixels 2 connected via the column signal line, and (ii) the source follower circuit weighted-averages in a voltage area outputs of the pixels 2 connected via the column signal line, and to provide the weighted-averaged outputs to the column signal line.

Instead of mixing the pixel signals in a row direction in the MUX 7, the solid-state imaging device structured above mixes the pixel signals in a row direction by (i) sending mixing information from the row selecting circuit 3 to the control unit 9, and (ii) turning on the Trs 38, 39, and 40 for mixing in a row direction provided between the column signal lines 19 on which the pixel signals are mixed.

Moreover, the solid-state imaging device in Embodiment 3 can realize the mixture of the pixel signals in a row direction with a use of a technique similar to that, for mixing the pixel signals in a column direction, in Embodiment 1 of the present invention. In other words, by changing the current values of the pixel current source circuit 4 according to the number of the pixels 2 to be mixed in a row direction, the solid-state imaging device in the third embodiment can secure a dynamic range in FD13 as shown in Embodiment 1 of the present invention. This realizes a high-quality image.

Embodiment 4

Described hereinafter in detail is a solid-state imaging device in accordance with an embodiment 4 of the present invention, with reference to the drawings. It is noted that Embodiment 4 describes only the differences between the solid-state imaging device in accordance with Embodiment 4 and that in accordance with Embodiment 1 of the present invention. The parts other than the described differences share the same characteristics as those in Embodiment 1 of the present invention. The solid-state imaging device in accordance with Embodiment 4 is different from that in accordance with Embodiment 1 in structure of an MUX.

Figure 12:
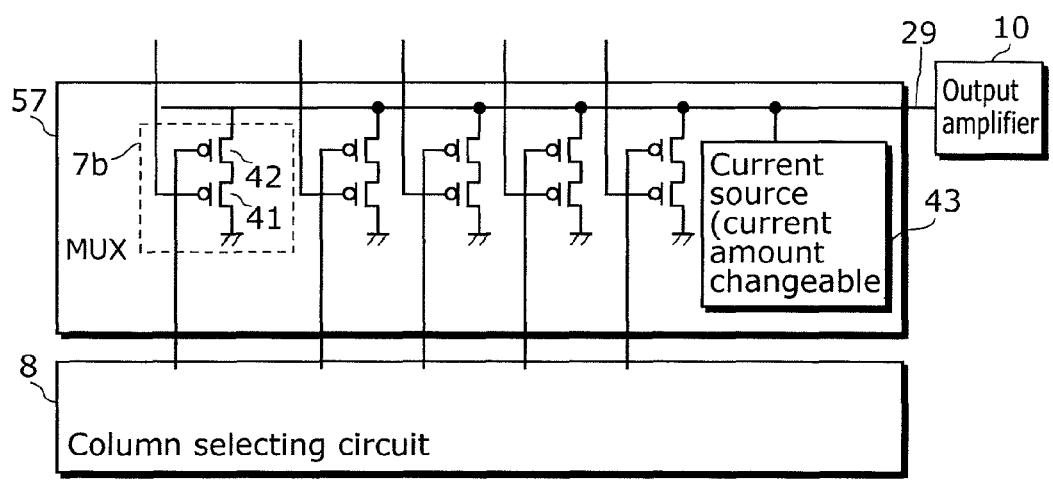
FIG. 12 shows in detail a structure of a multiplexer (MUX) in accordance with an Embodiment 4 of the present invention.

FIG. 12 shows in detail a structure of the solid-state imaging device (a structure on the periphery of an MUX 57) in accordance with Embodiment 4.

As shown in FIG. 12, the MUX 57 includes an S/H signal amplifying Tr 41, a column selecting Tr 42, and a current source 43 which can change current amounts according to the number of the mixed pixels. The MUX 57, exemplifying a mixture circuit according to an implementation of the present invention, mixes pixel signals each outputted to the different column signal line 19. Provided to a corresponding one of the signal lines 19, the S/H signal amplifying Tr 41 has the gate connected to the corresponding column signal line 19, the drain to one of the power source and the ground, and the source to the row common signal line 29. The current source 43 supplies an electric current to the row common signal line 29.

Since the circuit of the MUX 57 is structured as shown in FIG. 12, the solid-state imaging device in Embodiment 4 can realize the mixture of the pixel signals in a row direction with a use of a technique similar to that, for mixing the pixel signals in a column direction, in accordance with Embodiment 1 of the present invention. In other words, by changing the current values of the current source 43 according to the number of the pixels 2 to be mixed in a row direction, the solid-state imaging device in Embodiment 4 can secure a dynamic range in FD13 as shown in Embodiment 1 of the present invention. This realizes a high-quality image.

Further, since the circuit of the MUX 57 is structured as shown in FIG. 12, the source follower having the S/H signal amplifying Tr 41 and the current source 43 can curve attenuation of the pixel signals due to parasitic capacitance formed by the row common signal line 29, the pixel signals which are accumulated in the S/H capacitor 27. Thus, Embodiment 4 can realize row transfer with a smaller S/H capacitor 27, which realizes an inexpensive solid-state imaging device.

Embodiment 5

Described hereinafter in detail is a solid-state imaging device in accordance with Embodiment 5 of the present invention, with reference to the drawings. It is noted that Embodiment 5 describes only the differences between the solid-state imaging device in accordance with Embodiment 5 and that in accordance with Embodiment 1 of the present invention. The parts other than the described differences share the same characteristics as those in Embodiment 1 of the present invention.

Figure 13:
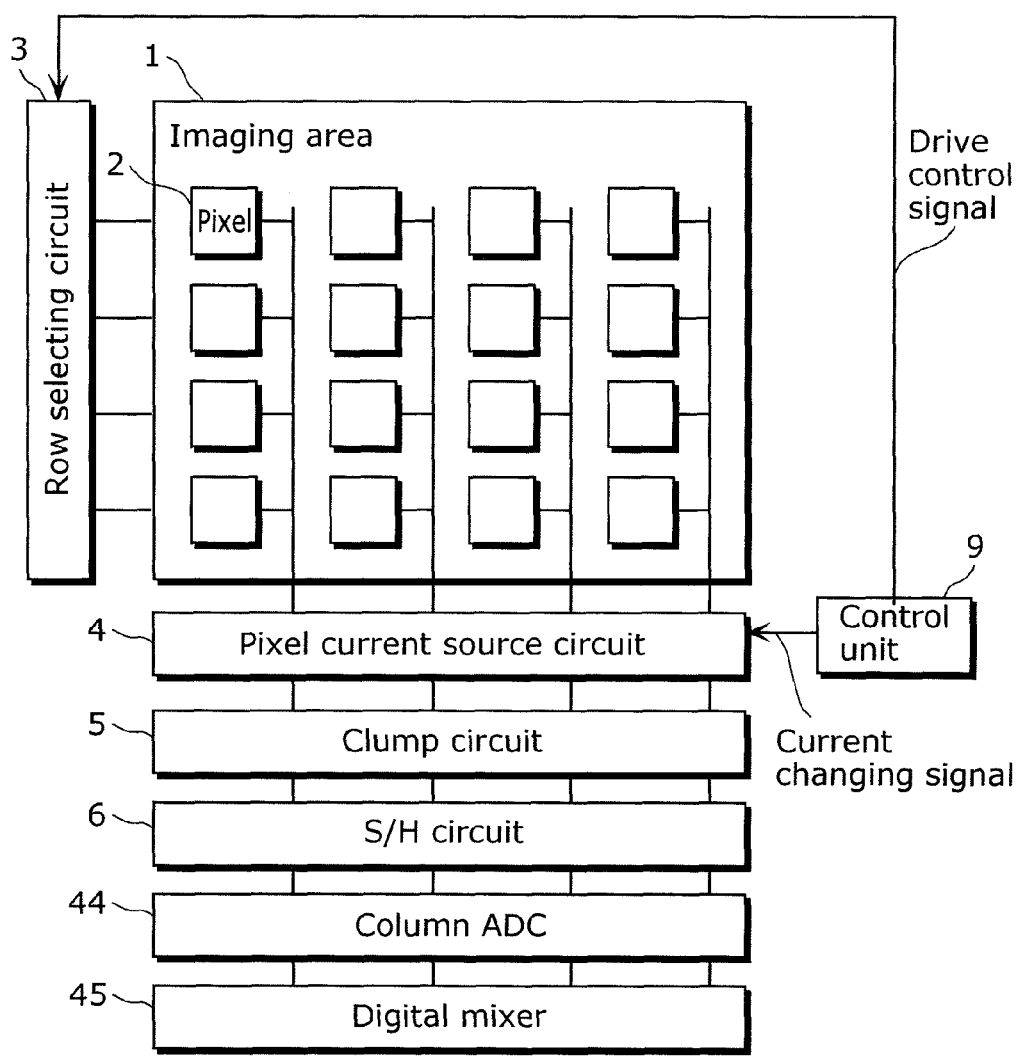
FIG. 13 shows an overall structure of a solid-state imaging device in accordance with an Embodiment 5 of the present invention.

FIG. 13 shows an overall structure of the solid-state imaging device in accordance with Embodiment 5.

As shown in FIG. 13, the solid-state imaging device includes the imaging area 1, the row selecting circuit 3, the pixel current source circuit 4, the control unit 9, the clump circuit 5, the S/H circuit 6, the row common signal line (not shown) a column ADC 44, and a digital mixer 45.

The column ADC 44 includes base units arranged in an array in a row direction. Each of the base units works as a column ADC, for one column, provided to a corresponding one of the columns on which the pixels 2 are arranged. The column ADC converts analog pixel signals, for each row, held in the S/H circuit 6 into digital signals. Exemplifying an AD converter according to an implementation of the present invention, each base unit of the column ADC 44 is provided to correspond to the column signal lines 19, and connected to the corresponding column signal lines 19. Each base unit of the column ADC 44 converts, to the digital signals, the analog pixel signals outputted to the connected column signal lines 19.

The digital mixer 45 includes base units arranged in an array in a row direction. Each of the base units is provided to a corresponding one of the columns on which the pixels 2 are arranged. The digital mixer 45 mixes the data outputted from the column ADC 44. Exemplifying a digital circuit according to an implementation of the present invention, the digital mixer 45 mixes the digital signals converted by different column ADCs 44.

Figure 14:
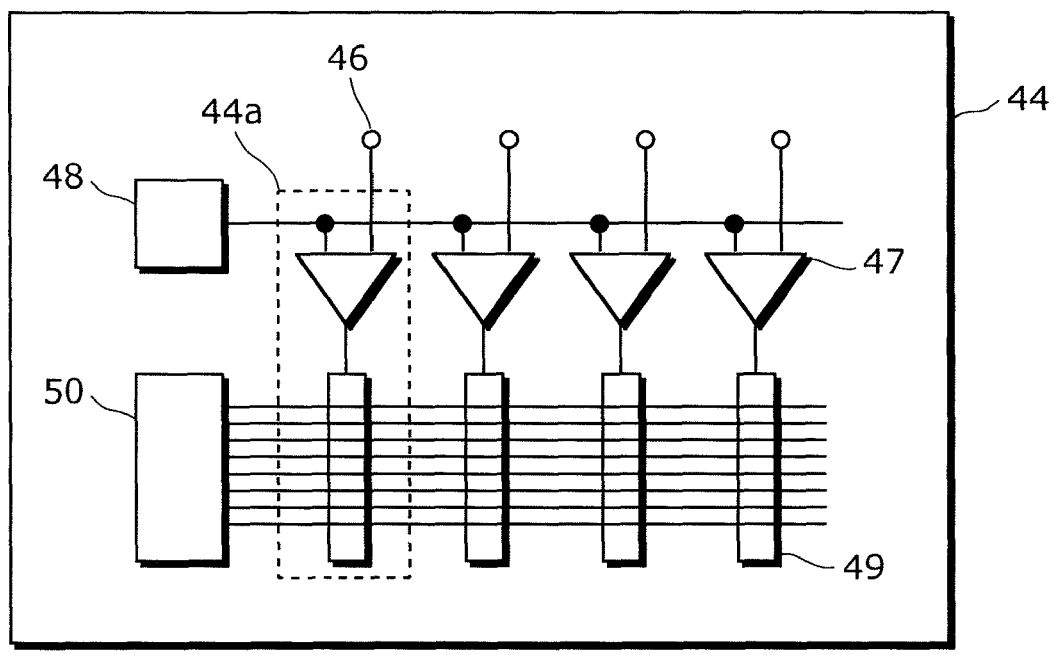
FIG. 14 shows in detail a structure of a column analog-digital converter (ADC) in the solid-state imaging device in accordance with Embodiment 5.

FIG. 14 shows in detail a structure of the solid-state imaging device (a structure of the column ADC 44) in accordance with Embodiment 5.

As shown in FIG. 14, the column ADC 44 includes a ramp waveform generating circuit 48, a comparator 47, a column ADC input terminal 46, a counter 50, and a latch 49.

The comparator 47: compares (i) the pixel signal inputted from the S/H circuit 6 via the column ADC input terminal 46 with (ii) a ramp waveform sent from the ramp waveform generating circuit 48; and outputs Hi when the ramp waveform is lower than the pixel signal. The counter 50 synchronizes with the ramp waveform to perform count-up. The column ADC 44 includes base units 44a based on the number of bits of the digital value after AD conversion. Each of the base units 44a includes the latch 49. When the output of the counter 50 is inputted in to the base unit 44a, and a latch signal sent from the counter 50 switches from Hi to Lo, an output of the counter 50 is written in the latch 49.

Figure 15:
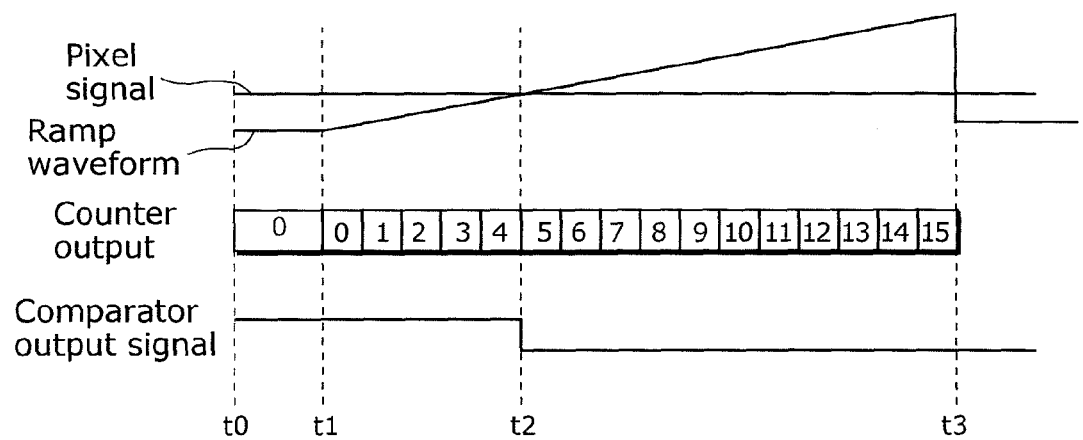
FIG. 15 is a timing chart showing timing, of each control signal, regarding an analog-digital (AD) conversion operation of the column ADC in the solid-state imaging device in accordance with Embodiment 5.

Described in detail next shall be a driving technique of the solid-state imaging device in accordance with Embodiment 5. FIG. 15 is a timing chart showing an AD conversion operation of the column ADC 44.

First, at timing "t0", the pixel signal is inputted into the column ADC 44. The ramp waveform is set to the minimum value of the pixel signal, and the counter 50 is set to 0. Here, the latch signal is Hi since the ramp waveform is in a lower level than the pixel signal.

Then, at timing "t1", the level of the ramp waveform starts rising. The upward inclination is set to reach the maximum value of the pixel signal at timing "t3". The counter 50 synchronizes with the rising ramp waveform to perform count-up.

Then, at timing "t2", the ramp waveform is greater than the pixel signal. Here, the latch signal is switched to Lo, and the counter value at the switching timing is written into the latch 49. As described above, the synchronization between the rising ramp waveform and the count-up makes the digital value written into the latch 49 correspond to the pixel signal.

The above AD conversion operation is performed in parallel on each column. The analogue pixel signals for one row are AD-converted in parallel, and are held as the digital signals in the latch 49 provided on each column.

Similar to the solid-state imaging device in accordance with Embodiment 1 of the present invention, the solid-state imaging device in accordance with Embodiment 5 employs the progressive-scanning mode and the pixel mixture mode. Described hereinafter is a signal reading operation performed in each of the modes.

First, the progressive-scanning mode involves selecting the pixels 2 for one row. From the pixels 2, the signals for one column are read to be held in the S/H circuit 6.

Then, the pixel signals for one row are read from the S/H circuit 6 to the column ADC 44, so that the column ADC 44 digital-converts the pixel signals.

Finally, the digital signals sent from each column are sequentially outputted outside the chip via an output unit (not shown).

By repeating the above operation as many times as the number of rows on which the pixels 2 are arranged, all the signals in the pixels 2 can be outputted.

Meanwhile, the pixel mixture mode also involves simultaneously selecting the pixels 2 provided on the plural rows, reading the signals for the plural rows from the pixels 2, and mixing the read signals on each of the column signal lines 19. Then, the mixed signals are held in the S/H circuit 6.

Then, the mixed pixel signals are read from the S/H circuit 6 and sent to the column ADC 44, so that the column ADC 44 digital-converts the read pixel signals.

Next, the digital pixel signals are read from the column ADCs 44 provided on the plural columns, and sent to the digital mixer 45, so that the digital mixer 45 mixes the read digital pixel signals.

Finally, the mixed digital signals are sequentially outputted outside the chip via the output unit (not shown).

By repeating the above operation as many times as the number of column mixings divided by the number of rows on which the pixels 2 are arranged, all the signals in the pixels 2 can be outputted.

As described above, the solid-state imaging device in accordance with Embodiment 5 can secure a wide dynamic range for the FD13 in both of the progressive-scanning mode and the pixel mixture mode and realize a high quality image, since the solid-state imaging device takes advantage of the same characteristics as the solid-state imaging device in accordance with Embodiment 1 have.

Comparative Example

Described hereinafter in a comparative example is a solid-state imaging device to be compared with the solid-state imaging device in accordance with Embodiments 1 to 5 of the present invention, with reference to the drawings.

Figure 16:
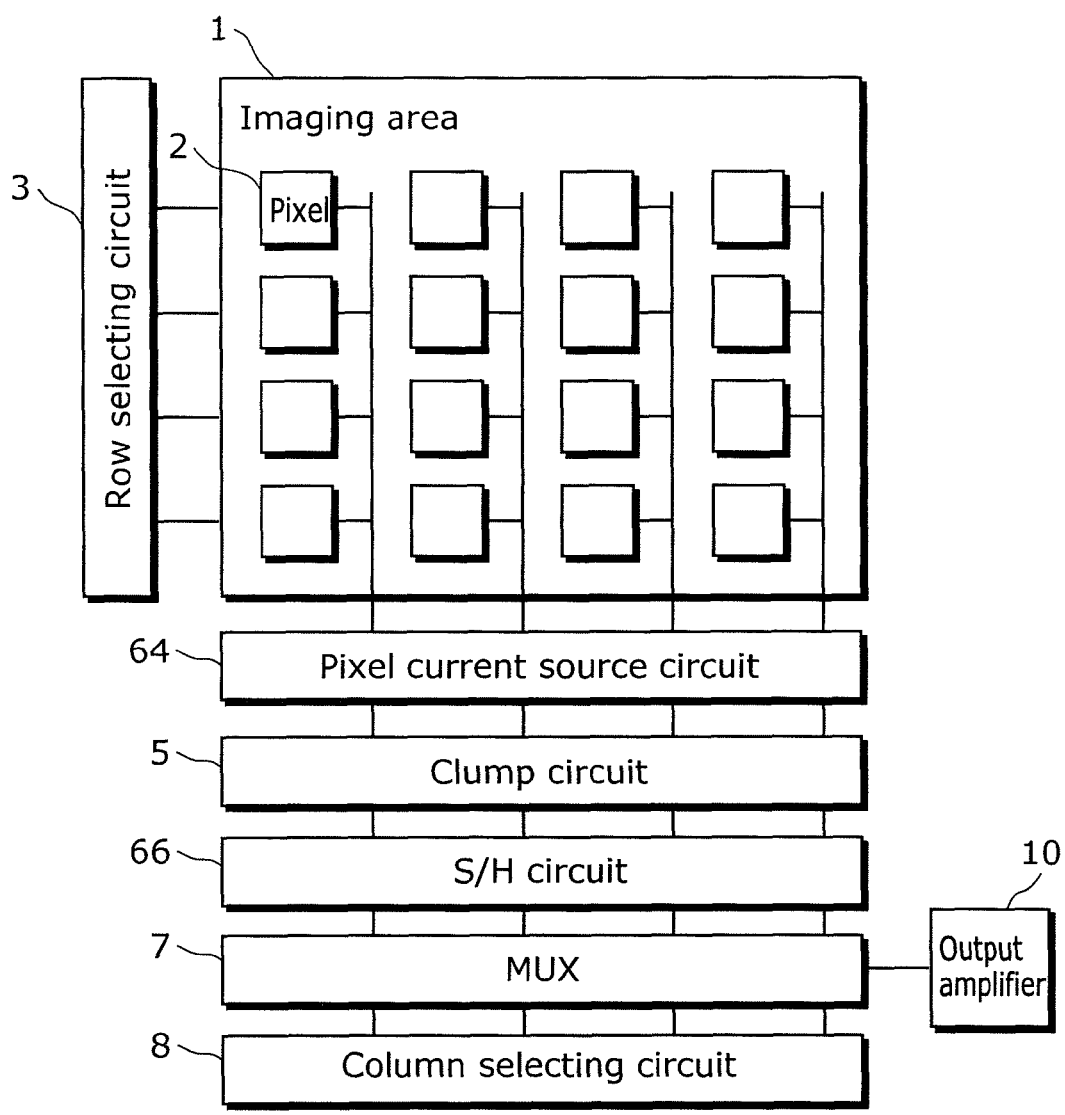
FIG. 16 shows an overall structure of a solid-state imaging device in accordance with a comparative example.

FIG. 16 shows an overall structure of the solid-state imaging device in accordance with the comparative example.

As shown in FIG. 16, the solid-state imaging device includes the imaging area 1, the row selecting circuit 3, a pixel current source circuit 64, the clump circuit 5, the S/H circuit 66, the MUX 7, the column selecting circuit 8, the output amplifier 10, and the row common signal line (not shown).

The pixel current source circuit 64 generates a current used for reading the pixel signal to the column signal line in resetting and reading the pixel signal.

Figure 17:
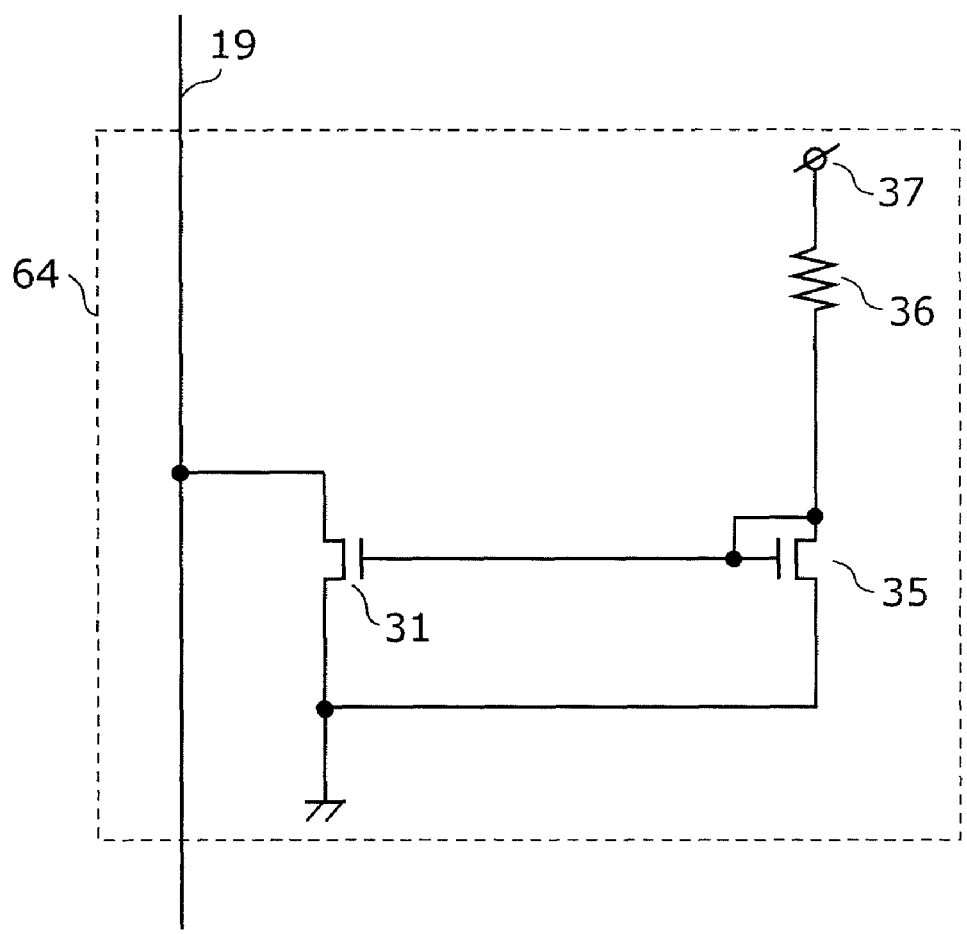
FIG. 17 shows in detail a structure of a pixel current source circuit in the solid-state imaging device in accordance with the comparative example.

FIG. 17 shows in detail a structure of the solid-state imaging device (a structure of the pixel current source circuit 64) in accordance with the comparative example.

As shown in FIG. 17, the pixel current source circuit 64 includes the power source 37, the resistor 36, and the current mirror having the Trs 35 and 31. The pixel current source circuit 64 generates a current used for reading each pixel signal to the column signal line 19. The current amount is constant regardless of the driving mode.

Figure 18:
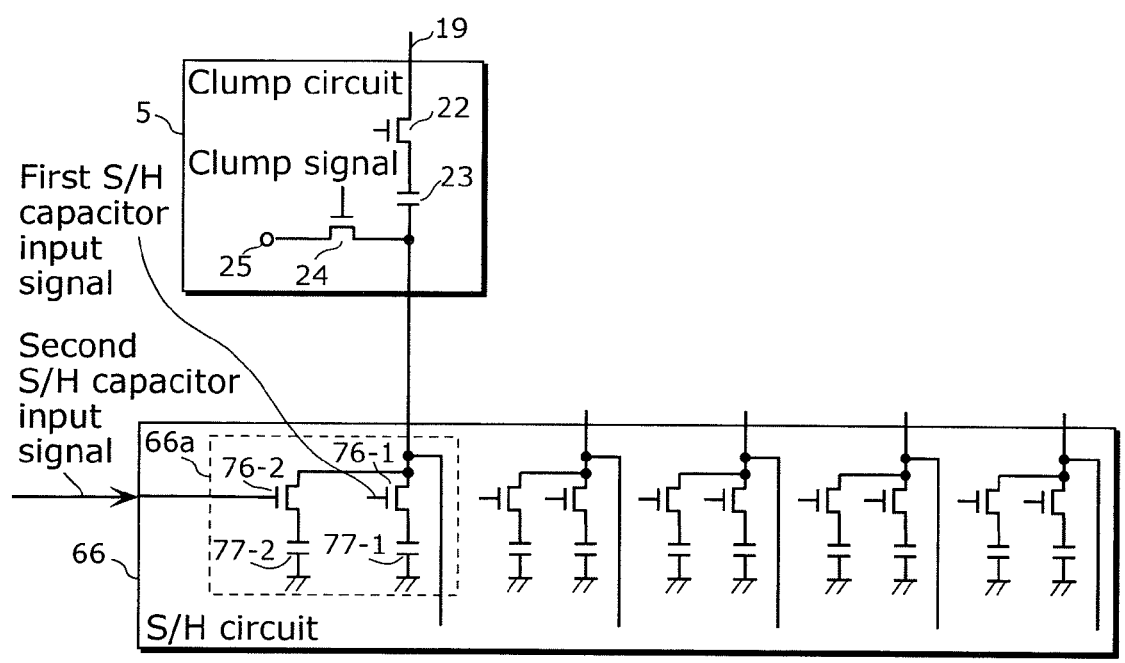
FIG. 18 shows in detail a structure of a column circuit in the solid-state imaging device in accordance with the comparative example.
Figure 19:
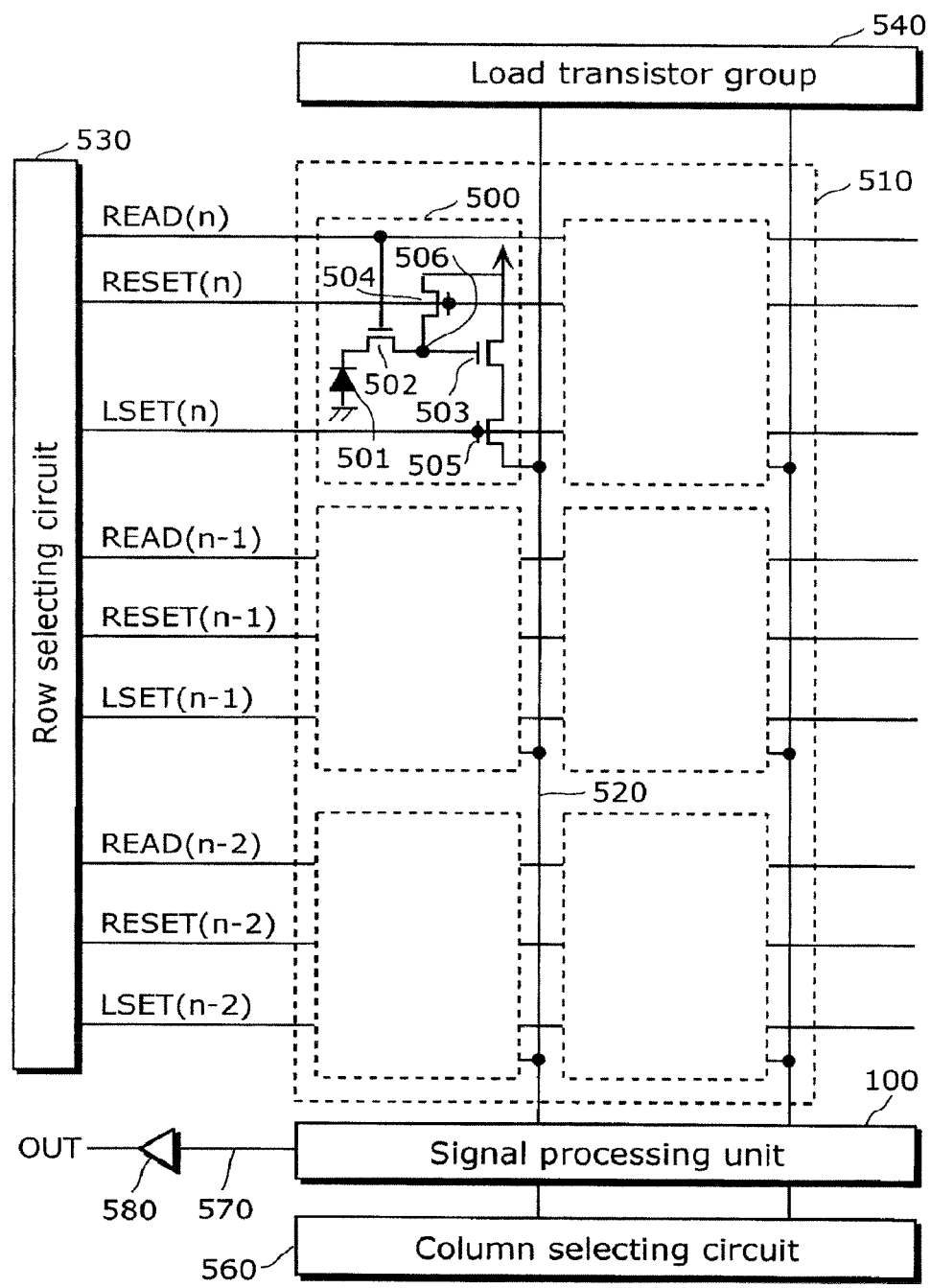
FIG. 19 shows an overall structure of a conventional solid-state imaging device.

FIG. 18 shows in detail a structure of the solid-state imaging device (a structure of a column circuit having the clump circuit 5 and the S/H circuit 66) in accordance with the comparative example.

The clump circuit 5 includes the clump capacitor 23, the clump voltage input terminal 25, and the clump Tr 24.

The S/H circuit 66 includes: S/H capacitors 77-1 and 77-2 which temporarily hold the pixel signals according to a first S/H capacitor input signal and a second S/H capacitor input signal both supplied to the gate; and S/H capacity input Trs 76-1 and 76-2 which respectively input the pixel signals to the S/H capacitors 77-1 and 77-2. The S/H circuit 66 is provided to a corresponding one of the columns on which the pixels 2 are arranged. The S/H circuit 66 includes plural base units 66a each of which temporarily holds a pixel signal sent from the corresponding one of the columns. The S/H circuit 66 has two S/H capacities provided on each column, so that up to two pixel signals are simultaneously held per column.

Described next in detail is an operation of the solid-state imaging device in accordance with the comparative example. The solid-state imaging device in accordance with the comparative example employs two kinds of driving modes; namely, the progressive-scanning mode and the pixel mixture mode.

The progressive-scanning mode first involves selecting the pixels 2 for one row by the row selecting circuit 3, and then reading the pixel signals for one row from the pixels 2 according to the current supplied from the pixel current source circuit 64. Here, both of the first and the second S/H capacitor input signals are brought to Hi. Thus the pixel signals read from the pixels 2 on a row basis are fixed pattern noise (FPN)-canceled by the clump circuit 5, and held in the two S/H capacitors 77-1 and 77-2.

Finally, each of the pixel signals held in the S/H capacitors 77-1 and 77-2 is sequentially outputted outside the chip one by one via the MUX 7 and the output amplifier 10.

By repeating the above operation as many times as the number of rows on which the pixels 2 are arranged, all the signals in the pixels 2 can be outputted.

In the case of mixing 2×2 pixels which total four pixels, meanwhile, the pixel mixture mode involves selecting the first row on which the pixels 2 are arranged, and bringing the first S/H capacitor input signal to Hi. This causes the pixel signals on the first row to be held in the S/H capacitor 77-1.

Next, the second row, on which the pixels 2 are arranged, is selected, and the second S/H capacitor input signal is brought to Hi. This causes the pixel signals on the second row to be held in the S/H capacitor 77-2.

Then, the first and the second S/H capacitor input signals are simultaneously brought to Hi, and the pixel signals in the S/H capacitors 77-1 and 77-2 are mixed. This mixing intends to mix, on each column, the pixel signals on the first and the second rows in a column direction (mixing pixel signal for two rows).

Finally, the pixel signals held in the S/H capacitors 77-1 and 77-2 (the pixel signals into which the pixel signals for two pixels are mixed in a column direction) are sequentially outputted outside the chip for every two columns via the MUX 7 and the output amplifier The above causes the pixel signals to be mixed in a row direction for two pixels (mixing the pixel signals for two columns). Consequently, the pixel signals, into which the pixel signals including 2×2 pixels totaling four pixels are mixed, are sequentially outputted. By repeating the above operation half as many times as the number of rows on which the pixels 2 are arranged, all the signals in the pixels 2 can be outputted.

In the solid-state imaging device in accordance with the comparative example, as described above, an individual S/H capacitor is provided in order to correspond to the number of pixels to be mixed, and an individual pixel signal is transferred to a corresponding S/H capacitor. This makes high speed processing difficult. Moreover, the increasing number of pixels to be mixed in a column direction causes the problems of the increasing number of the S/H capacitors as well as an enlarging chip size.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is effective for a solid-state imaging device, in particular for an image sensor used for an imaging device which requires high-image quality and high-performance, such as a digital single-lens reflex camera and a high-end compact camera.

What is claimed is:

1. A solid-state imaging device comprising:
an imaging area including pixel cells arranged two-dimensionally on a semiconductor substrate, each of said pixel cells having at least (i) a photodiode which accumulates signal charge obtained through photoelectric-conversion performed on incident light, (ii) an amplifying transistor which has a gate to which a voltage is applied according to the signal charge accumulated by said photodiode, and (iii) a reset transistor which resets a potential applied to the gate of said amplifying transistor;
a row selecting circuit which simultaneously drives said pixel cells arranged on a same row;
a column signal line which connects in a column direction outputs of amplifying transistors, including said amplifying transistor, included in said pixel cells arranged on the same column;
a pixel current source circuit which is connected to said column signal line and forms a source follower circuit along with said amplifying transistors in said pixel cells;
a row signal line which transfers signals provided to said column signal line in a row direction; and
a column selecting circuit which sequentially transfers to said row signal line the signals provided to said column signal line,
wherein, when said row selecting circuit simultaneously drives said pixel cells arranged on rows, (i) said source follower circuit having multi-inputs and a single-output includes (a) said amplifying transistors in said pixel cells connected via said column signal line, said connected pixel cells being included in said pixels arranged on the rows, and (b) said pixel current source circuit connected with the outputs of said amplifying transistors in said pixel cells connected via said column signal line, and (ii) said source follower circuit is configured to weighted-average in a voltage area outputs of said pixel cells connected via said column signal line, and to provide the weighted-averaged outputs to said column signal line.

2. The solid-state imaging device according to claim 1, wherein each of said pixel cells includes a transfer transistor between said photodiode and said amplifying transistor, said transfer transistor being controlled by said row selecting circuit, and said transfer transistors included in said pixel cells, arranged on the rows, simultaneously driven by said row selecting circuit are basically simultaneously turned on at a timing at which the outputs are provided from said pixel cells to said column signal line.

3. The solid-state imaging device according to claim 1, wherein each of said pixel cells includes a row selecting transistor between said amplifying transistor and said column signal line, said row selecting transistor being controlled by said row selecting circuit, and said row selecting transistors included in said pixel cells, arranged on the rows, simultaneously driven by said row selecting circuit are basically simultaneously turned on at a timing at which the outputs are provided from said pixel cells to said column signal line.

4. The solid-state imaging device according to claim 1, wherein each of said pixel cells includes (i) a transfer transistor between said photodiode and said amplifying transistor; and (ii) a row selecting transistor between said amplifying transistor and said column signal line, said transfer transistor and said row selecting transistor being controlled by said row selecting circuit, said transfer transistors included in said pixel cells, arranged on the rows, simultaneously driven by said row selecting circuit are basically simultaneously turned on at a timing at which the outputs are provided from said pixel cells to said column signal line, and said row selecting transistors included in said pixel cells, arranged on the rows, simultaneously driven by said row selecting circuit are basically simultaneously turned on at a timing at which the outputs are provided from said pixel cells to said column signal line.

5. The solid-state imaging device according to claim 1, wherein said column selecting circuit has the signals added at said row signal line, the signals having been provided to column signal lines, including said column signal line, arranged in the row direction.

6. A solid-state imaging device comprising:

an imaging area including pixel cells arranged two-dimensionally on a semiconductor substrate, each of said pixel cells at least having (i) a photodiode which accumulates signal charge obtained through photoelectric-conversion performed on incident light, (ii) an amplifying transistor which has a gate to which a voltage is applied according to the signal charge accumulated by said photodiode, and (iii) a reset transistor which resets a potential applied to the gate of said amplifying transistor;

a row selecting circuit which simultaneously drives said pixel cells arranged on a same row;

a column signal line which connects in a column direction outputs of amplifying transistors, including said amplifying transistor, included in said pixel cells arranged on the same column;

a pixel current source circuit which is connected to said column signal line and forms a source follower circuit along with said amplifying transistors in said pixel cells;

a transistor for mixing in a row direction which switches connection and disconnection between neighboring column signal lines including said column signal line;

a row signal line which transfers signals provided to said column signal line in a row direction; and a column selecting circuit which sequentially transfers to said row signal line the signals provided to said column signal line, wherein, when said row selecting circuit simultaneously drives said pixel cells arranged on a same row, (i) said source follower circuit having multi-inputs and a single-output includes (a) said amplifying transistors in said pixel cells connected via said transistor for mixing in a row direction and said column signal line, said connected pixel cells being included in said pixels arranged on the same row and (b) said pixel current source circuit connected with the outputs of said amplifying transistors in said pixel cells connected via said column signal line, and (ii) said source follower circuit is configured to weighted-average in a voltage area outputs of said pixel cells connected via said column signal line, and to provide the weighted-averaged outputs to said column signal line.

7. The solid-state imaging device according to claim 6, wherein each of said pixel cells includes a transfer transistor between said photodiode and said amplifying transistor, said transfer transistor being controlled by said row selecting circuit, and said transfer transistors included in said pixel cells, arranged on the same row, simultaneously driven by said row selecting circuit are basically simultaneously turned on at a timing at which the outputs are provided from said pixel cells to said column signal line.

8. The solid-state imaging device according to claim 6, wherein each of said pixel cells includes a row selecting transistor between said amplifying transistor and said column signal line, said row selecting transistor being controlled by said row selecting circuit, and said row selecting transistors included in said pixel cells, arranged on the same row, simultaneously driven by said row selecting circuit are basically simultaneously turned on at a timing at which the outputs are provided from said pixel cells to said column signal line.

9. The solid-state imaging device according to claim 6, wherein each of said pixel cells includes: (i) a transfer transistor between said photodiode and said amplifying transistor; and (ii) a row selecting transistor between said amplifying transistor and said column signal line, said transfer transistor and said row selecting transistor being controlled by said row selecting circuit, said transfer transistors included in said pixel cells, arranged on the same row, simultaneously driven by said row selecting circuit are basically simultaneously turned on at a timing at which the outputs are provided from said pixel cells to said column signal line, and said row selecting transistors included in said pixel cells, arranged on the same row, simultaneously driven by said row selecting circuit are basically simultaneously turned on at a timing at which the outputs are provided from said pixel cells to said column signal line.

10. The solid-state imaging device according to claim 6, said column selecting circuit has the signals added at said row signal line, the signals having been provided to column signal lines, including said column signal line, arranged in the row direction.

11. A solid-state imaging device comprising:

an imaging area including pixel cells arranged two-dimensionally on a semiconductor substrate, each of said pixel cells having at least (i) a photodiode which accumulates signal charge obtained through photoelectric-conversion performed on incident light, (ii) an amplifying transistor which has a gate to which a voltage is applied according to the signal charge accumulated by said photodiode, and (iii) a reset transistor which resets a potential applied to the gate of said amplifying transistor;

a row selecting circuit which simultaneously drives said pixel cells arranged on a same row;

a column signal line which connects in a column direction outputs of amplifying transistors, including said amplifying transistor, included in said pixel cells arranged on the same column;

a pixel current source circuit which is connected to said column signal line and forms a source follower circuit along with said amplifying transistors in said pixel cells;

a transistor for mixing in a row direction which switches connection and disconnection between neighboring column signal lines including said column signal line;

a row signal line which transfers signals provided to said column signal line in a row direction; and a column selecting circuit which sequentially transfers to said row signal line the signals provided to said column signal line, wherein, when said row selecting circuit simultaneously drives said pixel cells arranged on rows, (i) said source follower circuit having multi-inputs and a single-output includes (a) said amplifying transistors in said pixel cells connected via said transistor for mixing in a row direction and said column signal line, said connected pixel cells being included in said pixels arranged on the rows, and (b) said pixel current source circuit connected with outputs of said amplifying transistors in said pixel cells connected via said column signal line, and (ii) said source follower circuit is configured to weighted-average in a voltage area outputs of said pixel cells connected via said column signal line, and to provide the weighted-averaged outputs to said column signal line.

12. The solid-state imaging device according to claim 11, wherein each of said pixel cells includes a transfer transistor between said photodiode and said amplifying transistor, said transfer transistor being controlled by said row selecting circuit, and said transistor for mixing in a row direction and said transfer transistors included in said pixel cells, arranged on the rows, simultaneously driven by said row selecting circuit are basically simultaneously turned on at a timing at which the outputs are provided from said pixel cells to said column signal line.

13. The solid-state imaging device according to claim 11, wherein each of said pixel cells includes a row selecting transistor between said amplifying transistor and said column signal line, said row selecting transistor being controlled by said row selecting circuit, and said row selecting transistors included in said pixel cells, arranged on the rows, simultaneously driven by said row selecting circuit are basically simultaneously turned on at a timing at which the outputs are provided from said pixel cells to said column signal line.

14. The solid-state imaging device according to claim 11, wherein each of said pixel cells includes: (i) said transfer transistor between said photodiode and said amplifying transistor; and (ii) said row selecting transistor between said amplifying transistor and said column signal line, said transfer transistor and said row selecting transistor being controlled by said row selecting circuit, said transistor for mixing in a row direction and said transfer transistors included in said pixel cells, arranged on the rows, simultaneously driven by said row selecting circuit are basically simultaneously turned on at a timing at which the outputs are provided from said pixel cells to said column signal line, and said row selecting transistors included in said pixel cells, arranged on the rows, simultaneously driven by said row selecting circuit are basically simultaneously turned on at a timing at which the outputs are provided from said pixel cells to said column signal line.

15. The solid-state imaging device according to claim 1, wherein said solid-state imaging device is driven in either a mode for executing addition of the signals of said pixel cells or a mode for not executing addition of the signals of said pixel cells, and said pixel current source circuit supplies a current larger in said mode executing the addition of the signals of said pixel cells than in said mode not executing the addition of the signals of said pixel cells.

16. The solid-state imaging device according to claim 15, wherein each of said pixel cells includes, as said amplifying transistor, a first amplifying transistor and a second amplifying transistor which are different in at least one of (i) size, and (ii) film thickness of a gate oxide film, and when said row selecting circuit drives said pixel cell, one of said first amplifying transistor and said second amplifying transistor which are included in said driven pixel cell is turned on.

17. The solid-state imaging device according to claim 16, wherein, based on the number of rows of said pixel cells simultaneously driven by said row selecting circuit determines, one of said first amplifying transistor and said second amplifying transistor which are included in said driven pixel cell is determined to be turned on.

18. The solid-state imaging device according to claim 16, wherein said second amplifying transistor is either (i) smaller than said first amplifying transistor in ratio of a gate length with respect to a gate width, or (ii) greater than said first amplifying transistor in film thickness of the gate oxide film, when said row selecting circuit simultaneously drives said pixel cells arranged on the same row, said first amplifying transistors included in said driven pixel cells are turned on, and when said row selecting circuit simultaneously drives said pixel cells arranged on the rows, said second amplifying transistors included in said driven pixel cells are turned on.

19. The solid-state imaging device according to claim 1, wherein each of said pixel cells has a floating diffusion which is connected to the gate of said amplifying transistor, and accumulates the signal charge of said photodiode, and capacity of the gate of said amplifying transistor is greater than capacity of said floating diffusion.

20. The solid-state imaging device according to claim 6, wherein said solid-state imaging device is driven in either a mode for executing addition of the signals of said pixel cells or a mode for not executing addition of the signals of said pixel cells, and said pixel current source circuit supplies a current larger in said mode executing addition of the signals of said pixel cells than in said mode not executing addition of the signals of said pixel cells.

* * * * *